(12) United States Patent  
McEnroe et al.

(10) Patent No.: US 11,188,094 B2  
(45) Date of Patent: Nov. 30, 2021

(54) AUTONOMOUS VEHICLE SIGNALING SYSTEM

(71) Applicant: AT&T Intellectual Property I, L.P., Atlanta, GA (US)

(72) Inventors: Martin Patrick McEnroe, Plano, TX (US); John Boehm, Dallas, TX (US); Eric Zavesky, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/399,086

(22) Filed: Apr. 30, 2019

(65) Prior Publication Data

US 2020/0348689 A1  Nov. 5, 2020

(51) Int. Cl.
G05D 1/02 (2020.01)
B60Q 9/00 (2006.01)
G08G 1/09 (2006.01)

(52) U.S. Cl.
CPC .......... *G05D 1/0276* (2013.01); *B60Q 9/00* (2013.01); *G05D 1/0231* (2013.01); *G05D 2201/0213* (2013.01); *G08G 1/091* (2013.01)

(58) Field of Classification Search
None
See application file for complete search history.

(56) References Cited

U.S. PATENT DOCUMENTS 9,475,422 B2  10/2016  Hillis et al.
9,513,632 B1 *  12/2016  Gordon ............... G08G 1/163
(Continued)

FOREIGN PATENT DOCUMENTS

DE  102013226336 A1  6/2015
DE  102016113913 A1  2/2018
(Continued)

OTHER PUBLICATIONS

Richard Mason, Jim Radford, Deepak Kumar Robert Waters, Brian Fulkerson, Eagle Jones, David Caldwell, Jason Meltzer, Yaniv Alon, Amnon Shashua, Hiroshi Hattori, Emilio Frazzoli, and Stefano Soatto, "The Golem Group/University Of California At Los Angeles Autonomous Ground Vehicle In The DARPA Grand Challenge,"; accepted Jun. 12, 2006, 27 Pages, The Golem Group, Santa Monica, California, Journal of Field Robotics DOI 10.1002/rob.

(Continued)

*Primary Examiner* — Curtis J King
(74) *Attorney, Agent, or Firm* — Amin, Turocy & Watson, LLP

(57) ABSTRACT

A visual indicator system includes a sensor system, a visual indicator, a processing system coupled to the sensor system and the visual indicator, and a memory system that is coupled to the processing system and that includes instructions that, when executed by the processing system, cause the processing system to provide a visual indicator module. The visual indicator module receives first sensor data via the sensor system and determines based on the first sensor data that a first condition is satisfied. In response to the first condition being satisfied and via a first portion of the visual indicator, the visual indicator module provides a first visual indication that is associated with the first condition to a physical environment.

20 Claims, 8 Drawing Sheets

(56) References Cited

U.S. PATENT DOCUMENTS

| | | | |
|---|---|---|---|
| 9,552,735 | B2 | 1/2017 | Pilutti et al. |
| 9,586,585 | B2 | 3/2017 | Delp et al. |
| 9,589,464 | B2 | 3/2017 | Rovik et al. |
| 9,804,599 | B2 | 10/2017 | Kentley-Klay et al. |
| 9,855,890 | B2 | 1/2018 | James et al. |
| 9,881,503 | B1* | 1/2018 | Goldman-Shenhar ........................ G08G 1/166 |
| 9,953,538 | B1 | 4/2018 | Matthiesen et al. |
| 9,959,768 | B2 | 5/2018 | Leppanen et al. |
| 9,969,320 | B2 | 5/2018 | Kim et al. |
| 9,969,326 | B2 | 5/2018 | Ross et al. |
| 10,077,007 | B2 | 9/2018 | Meyhofer et al. |
| 10,134,280 | B1* | 11/2018 | You ............................ B60Q 1/34 |
| 10,139,818 | B2 | 11/2018 | Tao et al. |
| 10,467,903 | B1* | 11/2019 | Chase ................... G05D 1/0223 |
| 10,497,255 | B1* | 12/2019 | Friedland ............... H04R 1/403 |
| 10,560,862 | B1* | 2/2020 | Gallagher ................ H04W 24/10 |
| 2011/0157873 | A1* | 6/2011 | English ............... F21V 21/0832 362/103 |
| 2012/0218098 | A1* | 8/2012 | Ali ........................ B60Q 1/2696 340/467 |
| 2015/0268665 | A1 | 9/2015 | Ludwick et al. |
| 2015/0279194 | A1* | 10/2015 | Tseng .................... B60Q 1/1423 340/458 |
| 2016/0132705 | A1* | 5/2016 | Kovarik ............. G06K 7/10376 340/10.3 |
| 2016/0231746 | A1 | 8/2016 | Hazelton et al. |
| 2017/0060130 | A1* | 3/2017 | Kim .................... H04W 40/244 |
| 2017/0120803 | A1* | 5/2017 | Kentley ................ B60W 10/18 |
| 2017/0124781 | A1* | 5/2017 | Douillard ......... G08G 1/096816 |
| 2017/0192429 | A1* | 7/2017 | Tseng .................... G05D 1/0088 |
| 2017/0210297 | A1* | 7/2017 | Kim .......................... B60R 1/12 |
| 2017/0227964 | A1* | 8/2017 | Lehtiniemi ............... G08G 1/00 |
| 2017/0262715 | A1* | 9/2017 | Kozuka ................... B60K 35/00 |
| 2017/0345292 | A1* | 11/2017 | Haran ..................... G08G 1/005 |
| 2018/0037158 | A1* | 2/2018 | Schaye ................ B60Q 1/2661 |
| 2018/0056851 | A1* | 3/2018 | Kim ..................... G05D 1/0061 |
| 2018/0082588 | A1 | 3/2018 | Hoffman, Jr. et al. |
| 2018/0136654 | A1 | 5/2018 | Kentley-Klay et al. |
| 2018/0157925 | A1* | 6/2018 | Zeviar ................... G06K 9/2036 |
| 2018/0164825 | A1* | 6/2018 | Matus .................. G08G 1/0112 |
| 2018/0173237 | A1 | 6/2018 | Ley et al. |
| 2018/0272928 | A1* | 9/2018 | Boksteyn ............. A42B 3/0453 |
| 2018/0276986 | A1 | 9/2018 | Delp |
| 2018/3226982 | | 11/2018 | Paris et al. |
| 2019/0143888 | A1* | 5/2019 | Schaye ................ B60Q 1/2661 315/79 |
| 2019/0196482 | A1* | 6/2019 | Reiley ...................... B60Q 1/46 |
| 2019/0215671 | A1* | 7/2019 | Takii ...................... H04L 51/38 |
| 2019/0215695 | A1* | 7/2019 | Yang ................. H04W 12/1202 |
| 2019/0220026 | A1* | 7/2019 | Vawter ..................... B60Q 1/50 |
| 2019/0248276 | A1* | 8/2019 | Sutou .............. B60W 30/18163 |
| 2019/0248421 | A1* | 8/2019 | Jacobsthal ............... B60Q 1/50 |
| 2019/0315271 | A1* | 10/2019 | Tatara ...................... B60Q 1/54 |
| 2019/0329771 | A1* | 10/2019 | Wray ............... B60W 30/0953 |
| 2019/0387060 | A1* | 12/2019 | Kentley-Klay ....... H04L 67/306 |
| 2020/0018826 | A1* | 1/2020 | Cao ........................ G01S 13/931 |
| 2020/0029233 | A1* | 1/2020 | Gallagher .......... G01C 21/3415 |
| 2020/0142069 | A1* | 5/2020 | Onal ...................... G01S 17/10 |
| 2020/0346565 | A1* | 11/2020 | Li ............................ B60N 2/06 |
| 2020/0353862 | A1* | 11/2020 | Schaye ................. B60Q 1/442 |

FOREIGN PATENT DOCUMENTS

| | | | |
|---|---|---|---|
| WO | WO2017102259 | A1 | 6/2017 |
| WO | WO2018/098161 | A1 | 5/2018 |

OTHER PUBLICATIONS

Berthold Färber, "Communication And Communication Problems Between Autonomous Vehicles And Human Drivers," 2016, pp. 125-144, Chapter 7, M. Maurer et al. (eds.), Autonomous Driving, DOI 10.1007/978-3-662-48847-8_7, Bundeswehr Universität München, Neubiberg, Germany.

Tobias Lagström and Victor Malmsten Lundgren, "AVIP—Autonomous Vehicles' Interaction With Pedestrians, An Investigation Of Pedestrian-Driver Communication And Development Of A Vehicle External Interface," 2015, 84 Pages, Chalmers University of Technology, Master of Science Thesis in the Master Degree Program Industrial Design Engineering, Gothenborg, Sweden.

Samir Torki, Patrice Torguet, Cédric Sanza, Jean-Pierre Jessel, "Classifer System Based Autonomous Vehicles In HLA Distributed Driving Simulations," 2005, 11 Pages, Virtual Reality & Computer Graphics Research Group, IRIT, Université Paul Sabatier, France.

* cited by examiner

AUTONOMOUS VEHICLE SIGNALING SYSTEM

FIELD OF THE DISCLOSURE

This disclosure relates generally to autonomous vehicles and, more particularly, to an autonomous vehicle signaling system for communication between actors and autonomous vehicles.

BACKGROUND

Autonomous vehicles including fully-autonomous and semi-autonomous vehicles, such as unmanned aerial vehicles (UAVs), ground vehicles (e.g., cars, trucks, buses, and motorcycles, and watercraft (e.g., boats and submersibles) may rely on sensors that capture information about the surrounding environment that the autonomous vehicle is traversing. The autonomous vehicle may use the sensor information to perform maneuvers or otherwise navigate autonomously. Obtaining sensor information that accurately describes the surrounding environment is important for the safety of people and property transported by the autonomous vehicle and in the surrounding environment. Inaccurate sensor information may affect the decision-making process of the autonomous vehicle that results in unwanted or unsafe actions such as sudden stopping, changes in direction, exceeding speed limits, slowing traffic, and the like that could cause property damage and/or personal injury.

SUMMARY

Embodiments of the present disclosure describe systems and methods that provide for a method of autonomous vehicle signaling. During the method, a visual indicator module receives first sensor data. The visual indicator module determines based on the first sensor data that a first condition is satisfied, and provides, in response to the first condition being satisfied and via a first visual indicator, a first visual indication that is associated with the first condition to a physical environment.

In various embodiments of the method the first sensor data includes first actor data of a first actor that is associated with the first visual indicator and the first actor data indicates that the first actor is performing a first action. The first condition includes the first actor performing the first action. In various embodiments, the first sensor data includes second actor data of a second actor that is in the physical environment and the second actor data indicates that the second actor is performing a second action. In various embodiments, the first condition includes the second actor performing the second action. In various embodiments, the second action causes the first action. In yet other various embodiments, the second actor data includes a second visual indication provided by a second visual indicator associated with the second actor, and wherein the second visual indication is associated with the second action.

In various embodiments of the method, second sensor data is received subsequent to the first sensor data. Based on the second sensor data, it is determined that a second condition is satisfied. In response to the second condition being satisfied and via the first visual indicator, a second visual indication is provided to the physical environment that is different than the first visual indication.

In various embodiments of the method, second sensor data is received subsequent to the first sensor data. Based on the second sensor data, a determination is made that no condition is satisfied. In response to no condition being satisfied and via the first visual indicator, a second visual indication is provided to the physical environment that is different than the first visual indication.

In various embodiments of the method, second sensor data is received subsequent to the first sensor data. Based on the second sensor data, a determination is made that no condition is satisfied. In response to the second condition being satisfied and via a second visual indicator, a second visual indication is provided to the physical environment that is different than the first visual indication provided by the first visual indicator.

In various embodiments of the method, the receiving, the determining, and the providing is performed by at least one of a visual indicator module included in a wearable user device, an autonomous vehicle, a non-autonomous vehicle, a personal transportation device, or a traffic control unit.

In various embodiments of the method, an action is performed based on a second visual indication that is included in the first sensor data. In some embodiments, the action includes providing an output from a user output device included in a user input/output system.

Embodiments of the present disclosure describe systems and methods that provide for a visual indicator system that includes a sensor system, a visual indicator, a processing system coupled to the sensor system and the visual indicator, and a memory system that is coupled to the processing system and that includes instructions that, when executed by the processing system, cause the processing system to provide a visual indicator module. The visual indicator module is configured to receive first sensor data via the sensor system, determine based on the first sensor data that a first condition is satisfied, and provide, in response to the first condition being satisfied and via a first portion of the visual indicator, a first visual indication that is associated with the first condition to a physical environment.

In various embodiments, the visual indicator module is configured to perform an action based on a second visual indication that is included in the first sensor data.

In yet other various embodiments, the sensor system, the visual indicator, the processing system, and the memory system are housed or provided on a chassis of at least one of a wearable device, an autonomous vehicle, a non-autonomous vehicle, a personal transportation device, or a traffic control unit.

Embodiments of the present disclosure describe systems and methods that provide for a tangible machine-readable storage medium including machine readable instructions which, when executed, cause one or more processors of a device to perform operations that include receiving first sensor data; determining based on the first sensor data that a first condition is satisfied; and providing, in response to the first condition being satisfied and via a first visual indicator, a first visual indication that is associated with the first condition to a physical environment.

In various embodiments, the operations further include performing an action based on a second visual indication that is included in the first sensor data.

In various embodiments, the operations further include receiving second sensor data subsequent to the first sensor data; determining based on the second sensor data that a second condition is satisfied; and providing, in response to the second condition being satisfied and via the first visual indicator a second visual indication to the physical environment that is different than the first visual indication.

Figure 1:
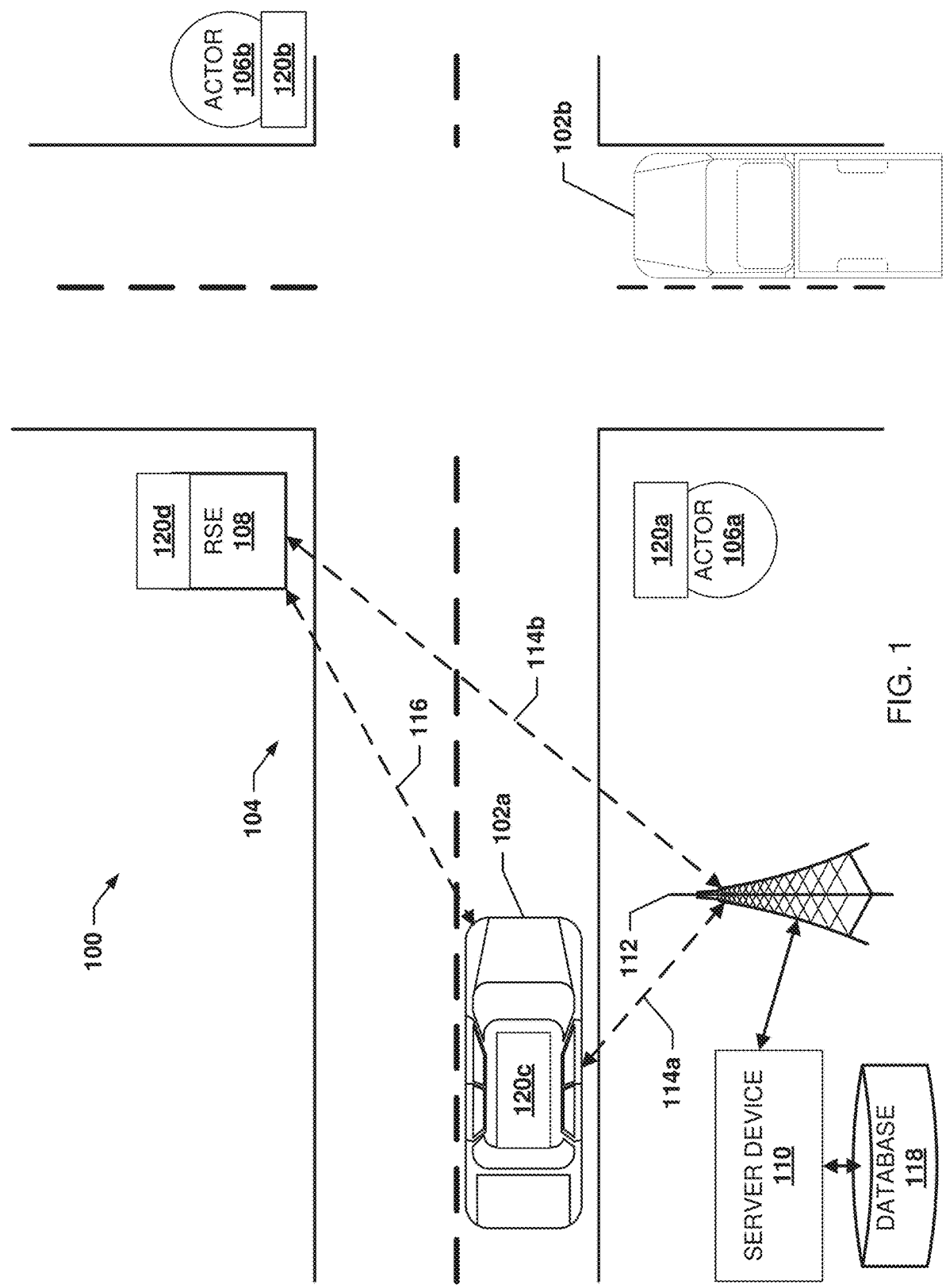
FIG. 1 is a schematic view illustrating an embodiment of an autonomous vehicle signaling system.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The systems and methods of the present disclosure provide for an autonomous vehicle signaling system. Today cyclists, pedestrians, and other actors in an environment rely heavily on interpreting the intent, skill, attention, and/or sobriety of the operators of a motor vehicle. For example, a cyclist waiting at an intersection may constantly seek the eyes of operators of motor vehicles and frequently "ask" them through hand signals, eye contact, or other body language, what they plan to do to avoid an accident. For example, a cyclist that does not receive some sort of eye contact or indication from a vehicle operator may not attempt a maneuver as the vehicle operator may not see them. Similarly, a pedestrian crossing at a crosswalk will carefully look both ways and attempt to discern the attention of a vehicle operator approaching a stop sign or traffic light. However, with autonomous vehicles there is no vehicle operator to observe or query. Therefore, it is difficult to discern from the cyclist's or the pedestrian's perspective whether an autonomous vehicle is going to obey traffic signs or signals and/or if the autonomous vehicle recognizes the pedestrian/cyclist. From the autonomous vehicle's perspective, it is difficult to identify what a cyclist or pedestrian is going to do. Minute changes in handlebar position and shifts of body weight can produce radical changes in position. Pedestrians and cyclists can accelerate very quickly.

Systems and methods of the present disclosure provide for autonomous vehicle signaling. In an embodiment, the autonomous vehicle may use existing autonomous vehicle visual indicators such as headlights, turn signals, etc. and/or additional visual indicators to communicate its actions and/or acknowledgement of an actor in the environment. While a turn signal may provide an indication that the autonomous vehicle is about to turn and the direction it is about to turn, systems and method of the present disclosure add other visual signals. For example, quickly flashing lights is a signal that the autonomous vehicle is yielding to another vehicle or actor.

In another example, an autonomous vehicle may include multicolor LED headlights that include a plurality of LEDs arranged in a circle. If the autonomous vehicle is proceeding at a constant speed with no notice of obstacle, no change in speed, no intent to turn, no notice of traffic signal then all LEDs are white and of similar strength (i.e., a default visual indication). If the vehicle is accelerating, then the LEDs may, for example, alternate brightness to create a clockwise "spinning" effect at speed ranges most attuned for human observation, the rate of "spin" would correspond to the rate of acceleration. If the vehicle is decelerating but not braking, then, for example, the LEDs can "spin" counter-clockwise at a rate commensurate with the decrease in speed. If the vehicle is actively braking, then a subset of the LEDs may display red while creating the counter-clockwise "spin" effect. Many additional actions, intents, and states of awareness can be encoded into light patterns including acknowledgment of an actor in an environment or elective choice to support of another's right-of-way. In addition to headlights, the autonomous vehicle may include visual indicators on the sides and the rear of the autonomous vehicle. In addition, there may be multiple systems tuned to the recipient actor (e.g., low intensity for pedestrian signaling, high intensity for rural road, low traffic environments). The autonomous vehicle may have a sensor system to read the visual signals provided by other autonomous vehicles and/or non-vehicle actors. This can be in addition to or in lieu of formal autonomous vehicle-to-vehicle electronic communication networks. All vehicles can participate. For example, newer vehicles may include integrated visual indicator systems with high capability. Older vehicles may include dashboard or magnetically mounted visual indicator systems with simple accelerometers built-in.

Pedestrians, cyclists, and/or other non-vehicular actors may opt into the autonomous vehicle signaling system based on their perceived need for safety and expectation of exposure. As such, the autonomous vehicle signaling system may include smart wear that includes visual indicator systems such as helmets, clothing, armbands, glasses, bike equipment that is integrated and associated but uses separate sensors to communicate to autonomous vehicles using a visual indicator. The visual indicator systems may be provided to actors lacking agency such as pets and very young children that increases their visibility and renders their intents much more obvious to autonomous vehicles and human actors as well. Other non-vehicular actors such as road side equipment (RSE) units that includes crossing gates, toll booths, parking garage gates can be equipped to communicate using visual indicator systems. It is likely to be much more certain to an autonomous vehicle that a railroad crossing gate is lowering based on a visual indicator system that is communicating a visual light pattern stating the barrier is lowering. Law enforcement personnel can use visual indicator system that communicate with light patterns to direct autonomous vehicles.

Referring now to FIG. 1, an embodiment of an autonomous vehicle signaling system 100 is illustrated. In the illustrated embodiment, the autonomous vehicle signaling system 100 includes an autonomous vehicle 102a (e.g., a self-driving vehicle) and a non-autonomous vehicle 102b provided in a physical environment 104. The physical environment 104 may be any indoor and/or outdoor space that may be contiguous or non-contiguous. For example, the physical environment 104 may include a roadway, a tunnel, a bridge, a waterway, a railway, and/or any other transportation infrastructure that would be apparent to one of skill in the art. In other examples, the physical environment 104 may include a yard, a home, a business, a park, a stadium, a museum, an amusement park, an access space, an underground shaft, an airspace, a body of water, and/or other spaces. The physical environment 104 may be defined by geofencing techniques that may include specific geographic coordinates such as latitude, longitude, and/or altitude, and/or operate within a range defined by a wireless communication signal. The physical environment 104 may include a plurality of actors such as an actor 106a and an actor 106b such as, for example, pedestrians, pets, children, cyclists, scooters, other personal transportation devices and/or any other actor that is capable of being in motion that would be apparent to one of skill in the art in possession of the present disclosure.

In various embodiments, the autonomous vehicle 102a may be implemented as an autonomous unmanned aerial vehicle (UAV), an autonomous car, an autonomous truck, an autonomous bus, an autonomous train, an autonomous submersible, an autonomous boat, any autonomous robot, an autonomous unicycle, an autonomous snowmobile, autonomous construction equipment, autonomous farming vehicles, and/or any unmanned or manned vehicular device that would be apparent to one of skill in the art in possession of the present disclosure. In the illustrated examples of the present disclosure, the autonomous vehicle is depicted as an autonomous automobile. In various embodiments, vehicles may be described as autonomous which may include fully-autonomous vehicles and/or semi-autonomous vehicles. As such, the autonomous vehicle 102a may each include an autonomous vehicle controller for making and executing decisions for the autonomous vehicles 102a. In various embodiments, the non-autonomous vehicle 102b may be implemented as a UAV, a car, a truck, a bus, a train, a motorcycle, a submersible, a boat, a snowmobile, a unicycle, construction equipment, farming equipment, and/or any unmanned or manned vehicular device that is controlled by a human user (e.g., non-autonomous).

In various embodiments, the autonomous vehicle signaling system 100 may include a roadside equipment (RSE) unit 108. The RSE unit 108 may be provided in the physical environment 104 to direct, inform, control, and/or warn traffic (e.g., the autonomous vehicle 102a, the non-autonomous vehicle 102b, and the actors 106a and/or 106b) within the physical environment 104. For example, the RSE unit 108 may be a railroad crossing gate, a tollbooth, a parking lot gate, signage, traffic lights, or other RSE units that would be apparent to one of skill in the art in possession of the present disclosure. Of course, in various embodiments, some or all of the components of the RSE unit 108 could be physically located other than "roadside", such as in a cabinet, a signal head, a buoy, a balloon in the atmosphere, or otherwise. Thus, while the present disclosure discusses an RSE unit when referring to autonomous automobiles, the RSE unit 108 may be generally referred to as a traffic control unit and may be provided in a physical environment (e.g., bodies of water, in the atmosphere, in a field) where other types of autonomous vehicles other than autonomous automobiles are present. The RSE unit 108 may be used to control many different types of traffic equipment and can be used to collect and send data about the physical environment 104 to a central monitoring station for further analysis or action and/or the autonomous vehicle 102a, using common networking and communication techniques, commonly specified 5G or subsequently developed adaptive multi-bandwidth approaches. As such, the autonomous vehicle 102a and the RSE unit 108 may include communication units having one or more transceivers to enable the autonomous vehicle 102a and the RSE unit 108 to communicate with each other and/or a server device 110. Accordingly and as discussed in further detail below, the autonomous vehicle 102a may be in communication with the RSE unit 108 directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the autonomous vehicle 102a and/or the RSE unit 108 in the autonomous vehicle signaling system 100 of FIG. 1 may include first (e.g., long-range) transceiver(s) to permit the autonomous vehicle 102a, and/or the RSE unit 108 to communicate with a network 112 via a communication channel 114a and a communication channel 114b. The network 112 may be implemented by an example mobile cellular network, such as a long-term evolution (LTE) network or other third generation (3G), fourth generation (4G) wireless network, or fifth-generation (5G) wireless network. However, in some examples, the network 112 may be additionally or alternatively be implemented by one or more other communication networks, such as, but not limited to, a satellite communication network, a microwave radio network, and/or other communication networks.

The autonomous vehicle 102a, and/or the RSE unit 108 additionally may include second (e.g., short-range) transceiver(s) to permit the autonomous vehicle 102a and/or the RSE unit 108 to communicate with each other via communication channel 116. The second transceiver may be used for vehicle-to-vehicle communications between the autonomous vehicle 102a and other autonomous vehicles. In the illustrated example of FIG. 1, such second transceivers are implemented by a type of transceiver supporting short-range (e.g., operate at distances that are shorter than the long-range transceivers) wireless networking. For example, such second transceivers may be implemented by a Wi-Fi transceiver (e.g., via a Wi-Fi Direct protocol), a Bluetooth® transceiver, an infrared (IR) transceiver, a Zigbee transceiver, and/or other transceivers that are configured to allow the autonomous vehicle 102a and/or the RSE unit 108 to intercommunicate via an ad-hoc or other wireless network.

The actor 106a, the actor 106b, the autonomous vehicle 102a and/or the RSE unit 108 may also include a visual indicator system 120a, 120b, 120c, and 120d, respectively, that may provide visual indications (e.g., light signals from the visual spectrum of the electromagnetic spectrum that is visible to the human eye (e.g., wavelengths of 380-740 nm)) based on information received from the physical environment 104 and the respective actor information, autonomous vehicle information, and/or RSE unit information for machine-to-human communication. However, in some embodiments the visual indicator systems may provide other visual indications that have wavelengths that are in the ultraviolet or infrared spectrums for machine-to-machine communication. Each visual indicator system 120a-120d may also be configured to detect the visual indications provided by other visual indicator systems within the physical environment 104. In various embodiments, the non-autonomous vehicle may include a visual indicator system such that the non-autonomous vehicle may be considered an actor (e.g., one of actors 106a and/or 106b) within the physical environment 104).

The autonomous vehicle signaling system 100 also includes or may be in communication with a server device 110. For example, the server device 110 may include one or more server devices, storage systems, cloud computing systems, and/or other computing devices (e.g., desktop computing device(s), laptop/notebook computing device(s), tablet computing device(s), mobile phone(s), etc.). As discussed below, the server device 110 may be coupled to an autonomous vehicle signaling database 118 that is configured to provide repositories such as an autonomous vehicle signaling repository of autonomous vehicle visual indication and instructions for those visual indications for autonomous vehicles within the physical environment 104. Also, the server device 110 may be configured to provide an autonomous vehicle controller that computationally processes sensor data (e.g., sensor data that includes environmental information, vehicle information, visual indicator information, and/or other information) received from the visual indicator systems 120a-120d, the RSE unit 108 and/or the autonomous vehicle 102a and render instructions to the autonomous vehicle 102a and/or RSE unit 108. While a specific autonomous vehicle signaling system 100 has been illustrated and described, one of skill in the art in possession of the present disclosure will recognize that the teachings of the present disclosure will be beneficial for a variety of autonomous vehicle signaling systems that would be apparent to one of skill in the art in possession of the present disclosure and, as such, a wide variety of modifications to the number, types, and orientation of devices in the autonomous vehicle signaling system 100 will fall within the scope of the present disclosure as well.

Figure 2:
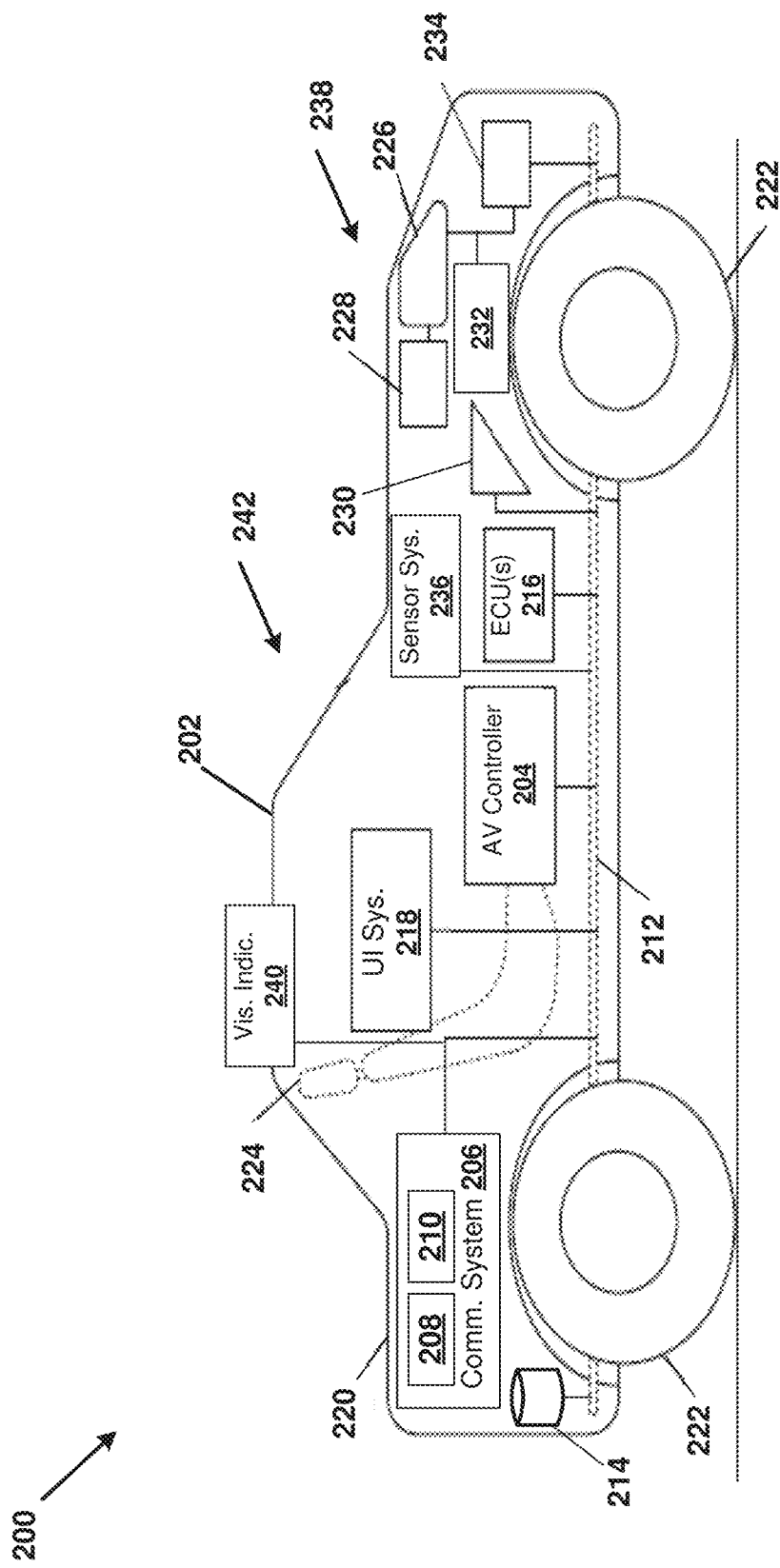
FIG. 2 is a schematic view illustrating an embodiment of an autonomous vehicle used in the autonomous sensor signaling system of FIG. 1.

Referring now to FIG. 2, an embodiment of an autonomous vehicle 200 is illustrated that may be the autonomous vehicles 102a discussed above with reference to FIG. 1. While the autonomous vehicle 200 is illustrated as an autonomous car, one of skill in the art in possession of the present disclosure may recognize that the autonomous vehicle 200 may be provided by a UAV, a robot, an unmanned vehicular device (e.g., land or water), and/or other vehicular device described above or that would be apparent to one of skill in the art in possession of the present disclosure. In the illustrated embodiment, the autonomous vehicle 200 includes a chassis 202 that houses the components of the autonomous vehicle 200. Several of these components are illustrated in FIG. 2. For example, the chassis 202 may house a processing system (not illustrated) and a non-transitory memory system (not illustrated) that includes instructions that, when executed by the processing system, cause the processing system to provide an autonomous vehicle controller 204 that is configured to perform the functions of the autonomous vehicle controllers and/or the autonomous vehicles discussed below.

The chassis 202 may further house a communication system 206 that is coupled to the autonomous vehicle controller 204 (e.g., via a coupling (e.g., a bus 212) between the communication system 206 and the processing system). The communication system 206 may include software or instructions that are stored on a computer-readable medium and that allow the autonomous vehicle 200 to send and receive information through the communication networks discussed above. For example, the communication system 206 may include a first communication interface 208 to provide for communications through the communication network 112 as detailed above (e.g., first (e.g., long-range) transceiver(s)). In an embodiment, the first communication interface 208 may be a wireless antenna that is configured to provide communications with IEEE 802.11 protocols (Wi-Fi), cellular communications, satellite communications, other microwave radio communications and/or communications. The communication system 206 may also include a second communication interface 210 that is configured to provide direct communication with other autonomous vehicles, the RSE unit 108, and/or other devices within the physical environment 104 discussed above with respect to FIG. 1 (e.g., second (e.g., short-range) transceiver(s)). For example, the second communication interface 210 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The communication system 206 of the illustrated example manages communications between the autonomous vehicle 200 and network entities (e.g., a car manufacturer, a telecommunication service provider, an internet service provider, a media provider, a certificate authority, etc.) via a wired and/or wireless connection (e.g., an IEEE 802.11 wireless connection, a Bluetooth connection, a cable/DSL/satellite modem, a cell tower, etc.). The communication system 206 of the illustrated example maintains network information (e.g., a network address, network settings, etc.) required to send and/or receive data over the various communication platforms. The communication system 206 manages the connections between the vehicle and outside entities (e.g., a Bluetooth connection between a mobile device and the example autonomous vehicle controller 204). In some examples, the communication system 206 may establish communicative connections with service providers that may provide a server device 110 and/or different network entities (e.g., a car manufacturer, a telecommunication service provider, an internet service provider, a media provider, a certificate authority, etc.) to send data from the autonomous vehicle 200 to the network entities and/or receive data from the network entities for delivery to the vehicle (e.g., driving profiles). In addition, the communication system 206 may communicate with a computing device, such as a personal electronic device (e.g., a smartphone, a tablet, a smart watch, etc.), a personal computer (e.g., a desktop, a laptop, etc.), a diagnostic computer (e.g., at a dealership, etc.), etc. In some examples, one or more computing devices connected to the autonomous vehicle 200 via the communication system 206 may transmit and receive information, such as vehicle diagnostic data, media files (e.g., movies, music, television programs, etc.) uploaded to a memory of the autonomous vehicle 200, firmware and/or software updates, driving profiles, environmental information about the physical environment 104, authentication identifiers (e.g., cryptographic keys), visual indicator information, and/or other autonomous vehicle information that would be apparent to one of skill in the art in possession of the present disclosure.

The chassis 202 may also house an autonomous vehicle storage system 214 that is coupled to the autonomous vehicle controller 204 through the processing system (e.g., via the bus 212). The autonomous vehicle storage system 214 may store sensor data, autonomous vehicle instructions and rules, visual indicator profiles that include visual indications and associated rules and instructions, and/or any other information or instructions that would be apparent to one of skill in the art in possession of the present disclosure.

The chassis 202 may also house a plurality of ECUs 216 that are coupled (e.g., via the bus 212) to the autonomous vehicle controller 204 through the processing system. The example ECUs 216 of FIG. 2 may be discrete computing devices. The example ECUs 216 may include a processor (e.g., a microcontroller) to process data and execute programmable instructions (e.g., assembly level instructions, functional sequential instructions, and/or object-oriented instructions). The example ECUs 216 also are provided with on-board memory (e.g., Static Random-Access Memory (SRAM), Electrically Erasable Programmable Read Only Memory (EEPROM), and/or Flash memory) to store data received and/or generated by the ECU 216. The example ECUs 216 are further provided with Input and/or Output (I/O) ports such as supply voltage inputs, digital and/or analog inputs, relay drivers, H-bridge drivers, injector drivers, and/or logic outputs. These I/O ports are used by the ECU 216 to receive data from sensors and transmit signals to mechanical components (e.g., actuators) to affect the mechanical components operations based on the operating parameters of the autonomous vehicle 200. The received data and/or the transmitted signals are communicated from the ECU 216 via the data bus 212 or through a directly wired connection between the ECU 216 and the mechanical component.

The example ECUs 216 of FIG. 2 control low level systems (e.g., door controls, headlight controls, engine controls, transmission controls, climate controls, seat controls, mirror controls, etc.) and/or high-level systems (e.g., radio systems, voice controls, entertainment systems, a telematic control unit managing a GPS/Navigation system, etc.) connected to the data bus 212. Each ECU 216 monitors its corresponding system by reading sensor signals. These sensors are placed on the mechanical components of the system and report factors such as position, temperature, speed, etc. These factors contribute to if, when, and/or how the ECU 216 generates output signals to execute control over the corresponding system.

For example, the ECU 216 responsible for door control has sensors monitoring door lock buttons, position of doors (e.g., open or closed), door locks (e.g., engaged or disengaged), and/or child lock switches (e.g., engaged or disengaged). Based on the readings of these sensors, the door control ECU 216 may, for example, decide on whether to generate a lock engaging signal to the doors of the vehicle.

Each of the ECUs 216 may be of different size and/or complexity according to the system the individual ECU 216 is controlling. In the illustrated example, the ECUs 216 are in communication with other units of the vehicle via the data bus 212. In some examples, the ECUs 216 may send information (e.g., the status of the systems or components of the vehicle, diagnostic information, telemetry data, environmental information, visual indicator information, etc.) to a remote device (e.g., a mobile device such as a smartphone, tablet, smartwatch, etc.) via the communication system 206 and/or may receive information (e.g., commands, driving profiles, operating parameters, firmware/software updates, media files, environmental information, signaling system standards etc.) from the remote device via the communication system 206. For example, such information may be communicated between the ECUs 216 and the remote device using a Bluetooth, Wi-Fi, or near field communication (NFC) connection generated and/or managed by the communication system 206.

The ECUs 216 may be deployed in a one-to-one fashion. That is, each ECU 216 is provided with processing power and system memory ample enough to control a corresponding single system of the vehicle. Each ECU 216 will vary in size according to the complexity of the corresponding system. In some examples, however, the ECUs 216 in the example autonomous vehicle 200 may be more robust and capable of controlling multiple systems (e.g., an ECM of the ECUs 216 may control the engine and the transmission system). For example, a robust ECU may be provided with amounts of processing power greater than a ECU processor for controlling a single system (e.g., more cores, faster clocking speeds, larger processing cache, etc.) and higher amounts of random access memory (RAM) may control more than one system as is typical of the average ECU.

The chassis 202 of the autonomous vehicle 200 may also house a user interface (UI) system 218 coupled to the autonomous vehicle controller 204 through the processing system. The user interface system 218 may include components such as a dashboard display, a media center, a center console display, user accessible buttons (e.g., climate controls, door lock controls), etc. The user interface system 218 may also include a data store to store media (e.g., movies, music, television programs, podcasts, etc.), system firmware, navigation data, diagnostic information, data collected by data collection systems (e.g., cameras mounted externally on the autonomous vehicle, weather data collection, etc.), driving profiles, etc. The example user interface system 218 also functions as a human-to-machine interface that provides options to the user of the autonomous vehicle 200 and communicates the user's selected options to the corresponding ECU 216 and/or the autonomous vehicle controller 204.

In the illustrated example of FIG. 2, the chassis 202 of the autonomous vehicle 200 may include a body 220, a wheel 222 (in examples where the autonomous vehicle is an autonomous automobile), a seat 224, a motor 226, a cooling system 228, a transmission 230, a braking system 232, a battery 234 (e.g., an electrical system), and/or a visual indicator 240. In the illustrated example, the body 220 covers the exterior of the autonomous vehicle 200 to protect and/or contain the other parts of the autonomous vehicle 200. In various embodiments of the autonomous vehicle of FIG. 2, the ECUs 216, via commands from the autonomous vehicle controller 204, may control the braking system 232, the cooling system 228, the transmission 230, the motor 226 and/or any other autonomous vehicle systems that are apparent to one of skill in the art in possession of the present disclosure. In various embodiments, components that enable the autonomous vehicle 200 to steer, accelerate, decelerate, and/or perform any other mechanical functions may be referred to a drive system 238. As such, the drive system 238 may also include the at least two wheels 222, the motor 226, the cooling system 228, the transmission 230 and/or any other system used to navigate the autonomous vehicle 200 in the physical environment 104.

In the illustrated example, the motor 226 may be implemented by a combustion engine, a DC electric motor, and/or an AC electric motor. The motor 226 may be communicatively coupled to the ECUs 216 and the transmission 230. The example ECU 216 may receive operating power from batteries 234 to control components of the motor 226 (e.g., throttle valve, sparkplugs, pistons, fuel injectors, etc.). The ECU 216 for the motor 226 receives signals from a user (e.g., via sensors in a pedal, etc.) and/or the autonomous vehicle controller 204 to determine corresponding control signals to communicate to the example motor 226 (e.g., manipulating throttle valve, firing spark plugs, altering fuel injection quantities, etc.). In the illustrated example, the motor 226 supplies torque to the transmission 230 to drive two or more wheels 222.

In various embodiments, the autonomous vehicle 200 may include a sensor system 236 that may be housed in the chassis 202 and/or provided on the chassis 202. The sensor system 236 may be coupled (e.g., coupled via the bus 212) to the autonomous vehicle controller 204 via the processing system. The sensor system 236 may include one or more sensors that gather sensor data about the autonomous vehicle 200 and/or physical environment 104 that may be provided to the autonomous vehicle controller 204 via the bus 212. The sensor data (e.g., environmental data) may be used by the autonomous vehicle controller 204 to make decisions regarding control signals to provide to ECUs 216 of the autonomous vehicle 200 to control the various systems when the autonomous vehicle 200 is in use and navigating the physical environment 104.

In various embodiments, the autonomous vehicle 200 may include a visual indicator system 242 that may be housed in the chassis 202 and/or provided on the chassis 202 and that may be the visual indicator system 120c of FIG. 1. The visual indicator system 242 may include the visual indicator 240 that may include a headlight, a turn signal, brake light. and/or any additional lighting apparatus mounted to the chassis 202. The visual indicator 240 may be configured to generate 100-1,000,000 lumens of light, such as full spectrum of visible light, a partial spectrum of visible light, and/or is adjustable based on the amount of sunlight illuminating the physical environment 104 such that the light generated by the visual indicator 240 may be distinguishable from the illumination of the physical environment 104 by the sun (e.g., partial or full sun) and/or some artificial lighting in cases where the physical environment is indoors. However, one of skilled in the art in possession of the present disclosures will recognize that other quantities of light and/or spectrums of light may be contemplated and fall within the scope of the present disclosure. For example, infrared (IR) and ultraviolet (UV) light sources at various power levels can also be utilized for machine-to-machine communication. For example, UV sources can be used for fully passive observance of behavior with non-autonomous actors utilizing unique properties of reflection and refraction versus other light spectra. Additionally, point-to-point UV communications systems have been recently demonstrated to achieve very high transmission rates (up to 71 Mbit at incident angles up to 12 degrees).

In an embodiment, if the visual indicator 240 includes a plurality of lights, the lights may be provided in different arrangements (e.g., a circular arrangement, a linear arrangement, an oval arrangement, a quadrilateral arrangement, and/or any other shaped arrangement that would be apparent to one of skill in the art in possession of the present disclosure. Each of the plurality of lights may be configured to independently activate and/or deactivate such that various visual indications (e.g., light patterns) may be provided by the visual indicator 240 by activating and deactivating particular lights.

The visual indicator system 242 may also include the sensor system 236 or a portion of the sensor system 236 that includes an imaging sensor system and/or a light detector for detecting light from visual indicators and decode a quick response code of visual indicators generated by other visual indicator system within the physical environment 104, as discussed in more detail below. The visual indicator system 242 may also include the communication system 206, the autonomous vehicle storage system 214 for storing visual indicator profiles that visual indications associated with instructions, rules and/or conditions, the autonomous vehicle controller 204 for processing visual indications received and/or providing visual indications via the visual indicator 240 based decisions made by the autonomous vehicle controller, and/or various ECUs for controlling the visual indicators.

Figure 3:
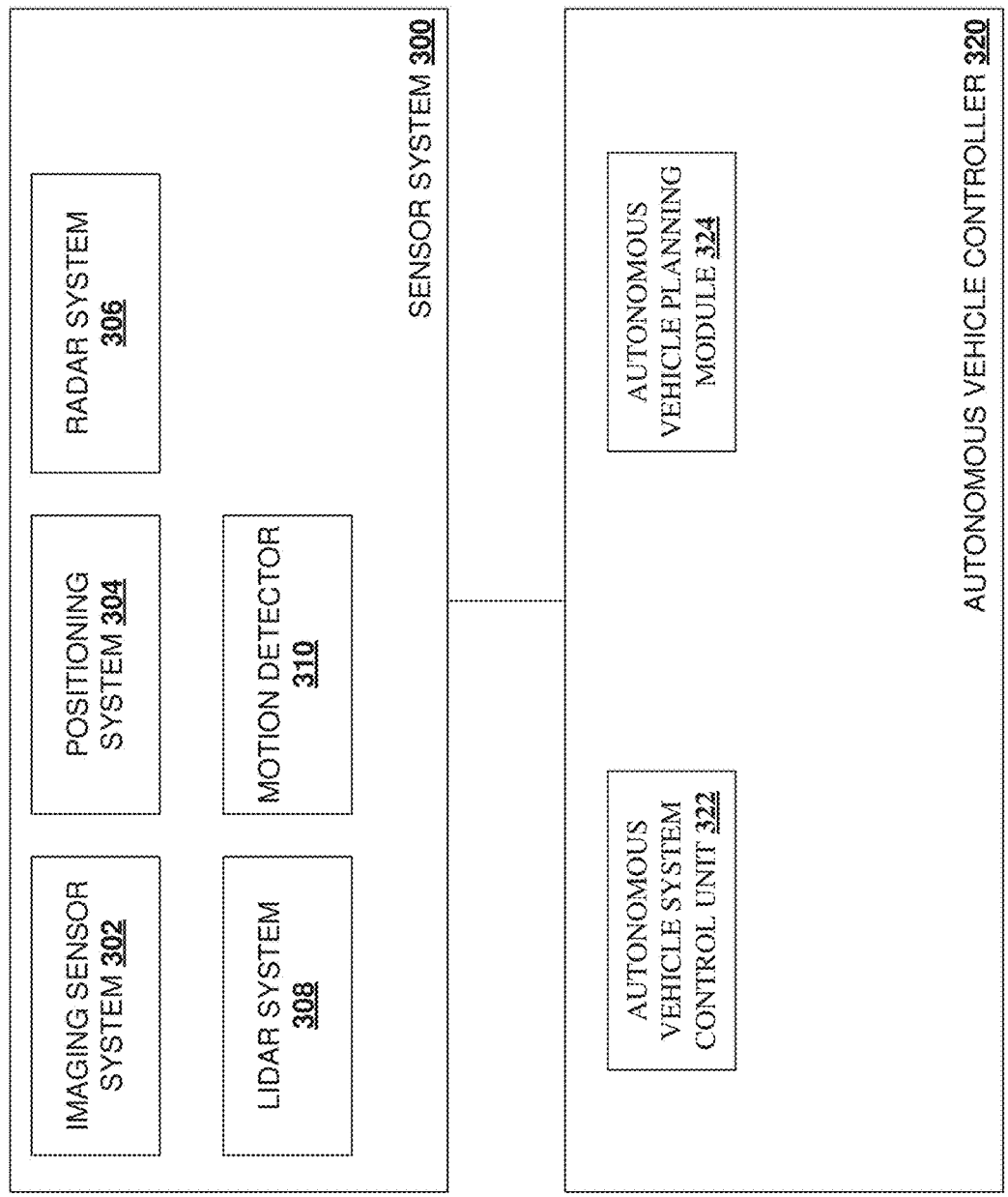
FIG. 3 is a schematic view illustrating an embodiment of a sensor system and an autonomous vehicle controller of the autonomous vehicle of FIG. 2.

Referring to FIG. 3, the sensor system 300 is illustrated that may be the sensor system 236 of FIG. 2. The sensor system 300 may include an imaging sensor system 302, a positioning system 304, a radar system 306, a lidar system 308, a motion detector 310, and/or any other sensors that would be apparent to one of skill in the art in possession of the present disclosure used for autonomously navigating the autonomous vehicle 200 through the physical environment 104 and/or operating the autonomous vehicle 200. In various embodiments, the imaging sensor system 302 may include a plurality of imaging sensors that provide on various locations of the chassis 202. For example, the imaging sensors may include, a two-dimensional image capturing camera, a three-dimensional image capturing camera, an infrared image capturing camera, a depth capturing camera, similar video recorders, and/or a variety of other image capturing devices. The imaging sensors may also include photodetectors to that may be used to gather visual indications from the physical environment 104. The imaging sensor system 302 may be used to gather visual information from the physical environment 104 surrounding the autonomous vehicle 200, for use in recognizing an actor (e.g., actor 106a and 106b) in the physical environment 104, and other functionality with the autonomous vehicle 200. In various examples, the imaging sensor may be mechanically movable, for example, by mounting the camera on a rotating and/or tilting a platform.

The sensor system 300 may also include the positioning system 304 that is coupled to the autonomous vehicle controller 204. The positioning system 304 may include sensors for determining the location and position of the autonomous vehicle 200 in the physical environment 104. For example, the positioning system 304 may include a global positioning system (GPS) receiver, a real-time kinematic (RTK) GPS receiver, a differential GPS receiver, a Wi-Fi based positioning system (WPS) receiver, an accelerometer, and/or other positioning systems and components.

The sensor system 300 may include a radar system 306 which may represent a system that utilizes radio signals to sense objects within the physical environment 104 of the autonomous vehicle 200. In some embodiments, in addition to sensing actors, the radar system 306 may additionally sense the speed and/or heading of the actors.

The sensor system 300 may include the lidar system 308, the lidar system 308 may include a light generator, for example, a laser device (e.g., a laser used in lidar (e.g., sometimes referred to as an acronym for light detection and ranging (LIDAR)), a laser scanner, a flash device (e.g., a flash LED, an electronic flash, etc.), and/or any other light generator for use in lidar and/or photogrammetry applications that would be apparent to one of skill in the art in possession of the present disclosure. The lidar system 308 may include an imaging sensor or light detector in capturing the light from the light generator that is reflected from actors (e.g., actors 106a and/or 106b) in the physical environment 104. For example, the lidar system 308 may utilize any of the imaging sensors in the imaging sensor system 302 or include its own imaging sensor (e.g., camera).

The sensor system 300 may also include a motion detector 310. The motion detector 310 may include an accelerometer, a gyroscope, and/or any other sensor for detecting and/or calculating the orientation and/or movement of the autonomous vehicle 200.

The sensor system 300 may further include other sensors, such as, a lighting sensor (to detect and decode visual indications as described herein), a sonar sensor, an infrared sensor, an ultraviolet sensor, a steering sensor, a throttle sensor, a braking sensor, and an audio sensor (e.g., a microphone). An audio sensor may be configured to capture sound from the physical environment 104 surrounding the autonomous vehicle 200. A steering sensor may be configured to sense the steering angle of a steering wheel, wheels 222 of the autonomous vehicle 200, or a combination thereof. A throttle sensor and a braking sensor may sense the throttle position and braking position of the autonomous vehicle 200, respectively. In some situations, a throttle sensor and a braking sensor may be integrated as an integrated throttle/braking sensor.

FIG. 3 also illustrates an autonomous vehicle controller 320 coupled to the sensor system 300 and that may be the autonomous vehicle controller 204 of FIG. 2. The autonomous vehicle controller 320 may include an autonomous vehicle system control unit 322 that includes modules that control and interact with the various systems of the autonomous vehicle 200. For example, autonomous vehicle system control unit 322 may communicate via the bus 212 via the various ECUs 216. In one embodiment, the autonomous vehicle system control unit 322 includes, but is not limited to, a steering unit, a throttle unit (also referred to as an acceleration unit), a braking unit, a visual indicator module, a transmission unit, and/or any other autonomous vehicle system unit that would be apparent one of skill in the art in possession of the present disclosure. For example, the autonomous vehicle system control unit 322 may be configured to communicate with respective ECUs for the brake system, the throttle system, the steering system, the visual indicator system and/or other systems of the autonomous vehicle. For example, the steering unit may adjust the direction or heading of the autonomous vehicle 200. The throttle unit may control the speed of the motor 226 or engine that in turn control the speed and acceleration of the autonomous vehicle 200. The braking unit may control the braking system 232 to decelerate the autonomous vehicle 200 by providing friction to slow the wheels 222 or tires of the autonomous vehicle. The steering unit may turn the wheels 222 or tires of the autonomous vehicle 200. Accordingly, a driving maneuver may include any driving actions performed by the autonomous vehicle 200, for example, by using one, or a combination, of the steering unit, the throttle unit, and the braking unit. The visual indicator module may communicate driving maneuvers of the autonomous vehicle 200 to the physical environment 104 by providing visual indications through the visual indicator 240 according visual indicator profiles under a convention that should be understandable to actors 106a and/or 106b. In another embodiment, the available modes for the ECUs may be modified after receiving signals from the control unit 322. For example, more aggressive autonomous driving, passing, and navigation modes (e.g., as "Mad Max" mode of Tesla, Inc.™ of Palo Alto, Calif.) maybe be enabled or disabled in response to a signal from the autonomous vehicle system control unit 322 when different non-autonomous or alternate autonomous vehicles are detected and communicated with through the proposed method. In another example, the enablement of these modes may be communicated with the visual indicator 240 that explicitly alerts the driver of a potential hazard.

The autonomous vehicle controller 320 may also include autonomous vehicle planning module 324. The autonomous vehicle planning module 324 may include a plurality of modules for perceiving the physical environment 104 and planning a route through the physical environment 104 according to instructions received by a user or externally provided data subsystem application. For example, the autonomous vehicle planning module 324 may manage environmental information such as localization data related to a trip or route of the user or application of the autonomous vehicle 200, such as for example a map, location information, route information, traffic information and other localization information.

Based on the sensor data provided by the sensor system 300 and environmental information obtained by localization module, a perception of the physical environment 104 is determined by the autonomous vehicle planning module 324. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, a crosswalk, or other traffic related signs (e.g., stop signs, yield signs), visual indications coming from visual indicator systems within the physical environment, and/or other perceptions that would be apparent to one of skill in the art in possession of the present disclosure. The autonomous vehicle planning module 324 may include a computer vision system or functionalities of a computer vision system to process and analyze images captured by one or more imaging sensors of the imaging sensor system 302 in order to identify objects, actors, and/or features in the physical environment 104 of autonomous vehicle 200. The actors may include the actors 106a and/or 106b described above. The computer vision system may use an actor recognition algorithm, video tracking, and other computer vision techniques. In some embodiments, the computer vision system can map an environment, track actors, and estimate the speed of actors, etc. The autonomous vehicle planning module 324 can also detect actors based on other sensor data provided by other sensors such as the radar system 306 and/or the lidar system 308 or by the visual indicator 240 provided by a visual indication system 242, which may provide a more instantaneous information about the actors within the physical environment 104 such as whether they are accelerating, decelerating, direction they are about to move and/or other actor intent information that would be apparent to one of skill in the art in possession of the present disclosure. The visual indications may provide more timely information to the autonomous vehicle 200 and/or may be more discernable than imaging the actor within the physical environment 104.

For each of the actors, autonomous vehicle planning module 324 decides regarding how to handle the actor. For example, for a particular actor (e.g., another vehicle in a crossing route) as well as its metadata describing the actor (e.g., a speed, direction, turning angle), which may include translations of the visible indications received from visible indicator systems within the physical environment to metadata describing the actor, the autonomous vehicle planning module 324 decides how to encounter the actor (e.g., overtake, yield, stop, pass). The autonomous vehicle planning module 324 may make such decisions according to a set of rules such as traffic rules, which may be stored in the autonomous vehicle storage system 214. Based on a decision for each of the actors perceived, the autonomous vehicle planning module 324 plans a path or route for the autonomous vehicle 200, as well as driving parameters (e.g., distance, speed, and/or turning angle). That is, for a given actor, the autonomous vehicle planning module 324 decides an action to take based on the actor and how to take the action. The autonomous vehicle planning module 324 generates planning and control data including information describing how the autonomous vehicle 200 would move in a next interval. The planning and control data, is fed by the autonomous vehicle planning module 324 to the autonomous vehicle system control unit 322 that controls and drives the autonomous vehicle 200, by sending proper commands or signals to the autonomous vehicle system control unit 322, according to a route or path defined by the planning and control data. The planning and control data include sufficient information to drive the autonomous vehicle 200 from a first point to a second point of a route or path. While a specific autonomous vehicle 200, sensor system 300, and autonomous vehicle controller 320 has been illustrated and described, one of skill in the art in possession of the present disclosure will recognize that the teachings of the present disclosure will be beneficial for a variety of autonomous vehicles, sensor systems, and autonomous vehicle controllers that would be apparent to one of skill in the art in possession of the present disclosure and, as such, a wide variety of modifications to the number, types, and orientation of devices and modules in the autonomous vehicle 200, the sensor system 300, and the autonomous vehicle controller 320 will fall within the scope of the present disclosure as well.

Figure 4:
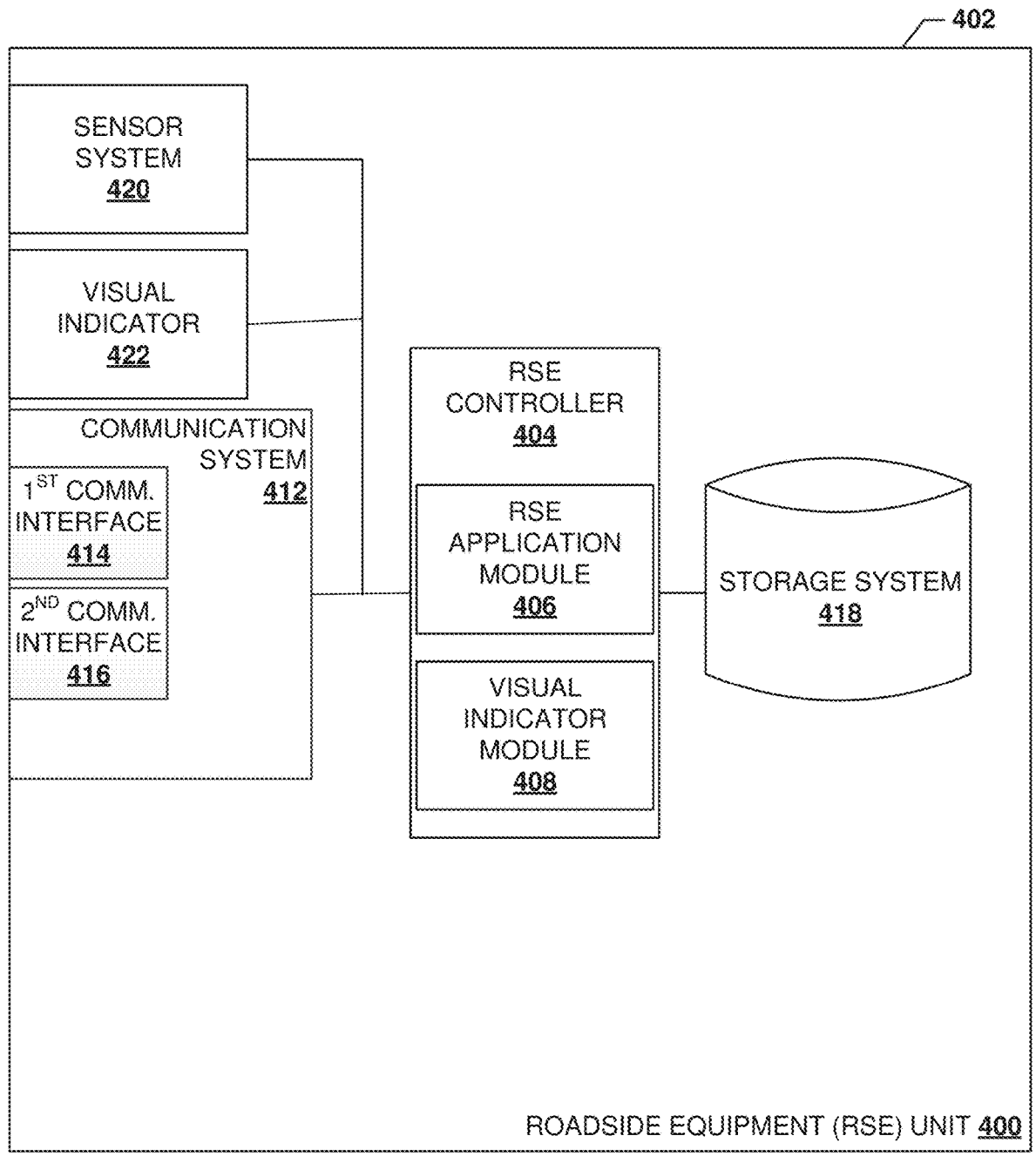
FIG. 4 is a schematic view illustrating an embodiment of a roadside equipment (RSE) unit used in the autonomous vehicle signaling system of FIG. 1.

Referring now to FIG. 4, an embodiment of a roadside equipment (RSE) unit 400 is illustrated that may be the RSE unit 108 discussed above with reference to FIG. 1. In the illustrated embodiment, the RSE unit 400 includes a chassis 402 that houses the components of the RSE unit 400. Several of these components are illustrated in FIG. 4. For example, the chassis 402 may house a processing system (not illustrated) and a non-transitory memory system (not illustrated) that includes instructions that, when executed by the processing system, cause the processing system to provide an RSE controller 404 that is configured to perform the functions of the RSE controllers and/or the autonomous vehicles discussed below. In the specific example illustrated in FIG. 4, the RSE controller 404 is configured to provide an RSE application module 406 to perform specific functions of the RSE unit 400. For example, if the RSE unit 400 is a traffic light, the RSE application module 406 may include instructions to operate the signals of the traffic light. However, in other embodiments, the RSE unit 400 may be dedicated for facilitating autonomous vehicle traffic, as such the RSE application module 406 may be configured to generate and provide the specific autonomous vehicle instructions to the autonomous vehicles 102a and/or 102b in the physical environment 104. In other specific examples, the RSE unit 108 may be a railroad crossing gate and the RSE application module 406 may execute instructions to operate the railroad crossing gate (e.g., raising and lowering). The RSE controller 404 may also include a visual indicator module 408 that may operate similar to the visual indicator module of the autonomous vehicle system control unit 322 discussed above in FIG. 3. As such, the visual indicator module 408 may generate visual indications via a visual indicator 422 based on environmental information generated by a sensor system. The visual indicator module 408 may also be configured to process visual indications received from other autonomous vehicles and/or other actors in the physical environment 104.

The chassis 402 may further house a communication system 412 that is coupled to the RSE controller 404 (e.g., via a coupling between the communication system 412 and the processing system). The communication system 412 may include software or instructions that are stored on a computer-readable medium and that allow the RSE unit 400 to send and receive information through the communication networks discussed above. For example, the communication system 412 may include a first communication interface 414 to provide for communications through the network 112 as detailed above (e.g., first (e.g., long-range) transceiver(s)). In an embodiment, the first communication interface 414 may be a wireless antenna that is configured to provide communications with IEEE 802.11 protocols (Wi-Fi), cellular communications, satellite communications, other microwave radio communications and/or communications. The communication system 412 may also include a second communication interface 416 that is configured to provide direct communication with the autonomous vehicle 102a, other RSE units, and/or other devices within the physical environment 104 discussed above with respect to FIG. 1 (e.g., second (e.g., short-range) transceiver(s)). For example, the second communication interface 416 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 402 may also house a storage system 418 that is coupled to the RSE controller 404 through the processing system. The storage system 418 may store sensor data, autonomous vehicle instructions, visual indicator profiles that include visual indications associated with instructions, conditions, and/or translations that would be apparent to one of skill in the art in possession of the present disclosure.

In various embodiments, the RSE unit 400 may include a sensor system 420 that may be housed in the chassis 402 and/or provided on the chassis 402. The sensor system 420 may be coupled to the RSE controller 404 via the processing system. The sensor system 420 may include one or more sensors that gather sensor data about the RSE unit 400 and/or physical environment 104 that may be provided to the RSE controller 404 and more specifically to the visual indicator module 408. The sensor data may be used by the visual indicator module 408 to generate visual indications via the visual indicator 422. In various embodiments, the sensor system 420 may include the sensor system 300 of FIG. 3.

The chassis 402 may also house the visual indicator 422 or the visual indicator 422 may be partially provided on the chassis 402 to provide a direct line-of-sight with the physical environment 104. The visual indicator 422 may include one or more lights (e.g., Light-emitting diodes (LEDs), halogen bulbs, fluorescent bulbs, incandescent bulbs, lasers, and/or other light generating devices) that are configured to generate 100-1,000,000 lumens of light, such as the full spectrum of visible light, a partial spectrum of visible light, and/or are configured to provide adjustable illumination based on the amount of sunlight illuminating the physical environment 104 such that the light generated by the visual indicator 422 may be distinguishable from the illumination of the physical environment 104 by the sun (e.g., partial or full sun) and/or some artificial lighting in cases where the physical environment 104 is indoors. In other embodiments, the visual indicator 422 may include an infrared (IR) source and/or an ultraviolet (UV) light source at various power levels that can also be utilized for machine-to-machine communication. For example, UV sources can be used for fully passive observance of behavior with non-autonomous actors utilizing unique properties of reflection and refraction versus other light spectra. Additionally, point-to-point UV communications systems have been recently demonstrated to achieve very high transmission rates (up to 71 Mbit at incident angles up to 12 degrees).

If the visual indicator 422 includes a plurality of lights, the lights may be provided in different arrangements (e.g., a circular arrangement, a linear arrangement, an oval arrangement, a quadrilateral arrangement, and/or any other shaped arrangement that would be apparent to one of skill in the art in possession of the present disclosure. The each of the plurality of lights may be configured to independently activate and/or deactivate such that various visual indications may be provided by the visual indicator 422 by activating and deactivating particular lights. While an RSE unit 400 has been illustrated and described, one of skill in the art in possession of the present disclosure will recognize that the teachings of the present disclosure will be beneficial for a variety of RSE units that would be apparent to one of skill in the art in possession of the present disclosure and, as such, a wide variety of modifications to the number, types, and orientation of devices and modules in the RSE unit 400 will fall within the scope of the present disclosure as well.

Figure 5:
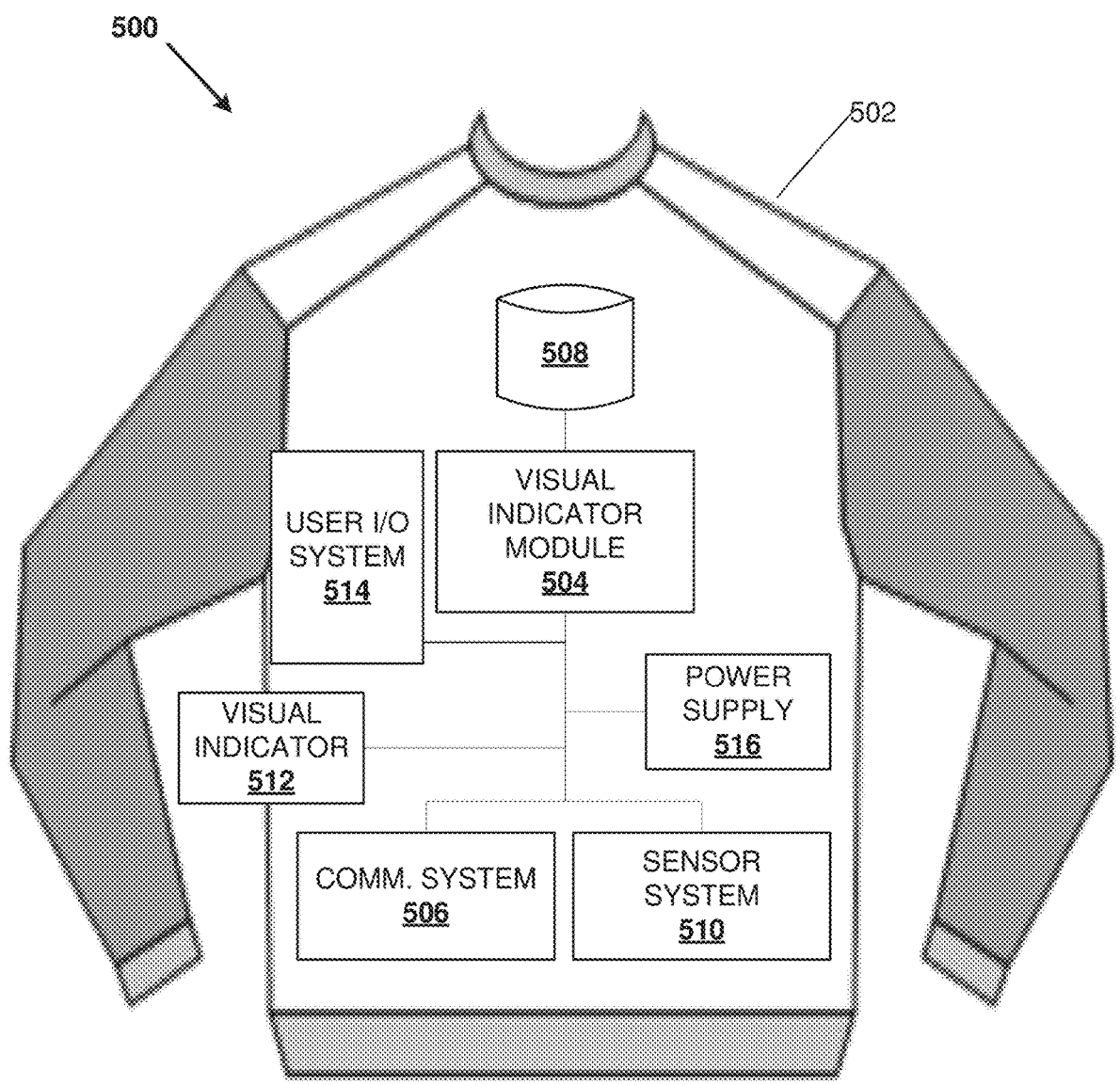
FIG. 5 is a schematic view illustrating an embodiment of a visual indicator system used in the autonomous vehicle signaling system of FIG. 1.

Referring now to FIG. 5, an embodiment of a visual indicator system 500 is illustrated that may be visual indicator system 120a and/or 120b discussed above with reference to FIG. 1. In the illustrated embodiment, the visual indicator system 500 includes a chassis 502 that houses the components of the visual indicator system 500. The chassis 502 may include a wearable device such as, for example, a helmet, a shirt, an armband, a leg band, a vest, a shirt, a backpack, a pair of glasses, a shoe, a watch, a jacket (as illustrated as an example in FIG. 5), and/or any other wearable device that would be apparent to one of skill in the art in possession of the present disclosure. Alternative to or in addition to the wearable device, the chassis 502 may include a non-autonomous vehicle or a personal transportation vehicle (e.g., a bike, a scooter, rollerblades, a skateboard, a hoverboard, and/or any other personal transportation vehicle that would be apparent to one of skill in the art in possession of the present disclosure.

For various examples, the chassis 502 may house a processing system (not illustrated) and a non-transitory memory system (not illustrated) that includes instructions that, when executed by the processing system, cause the processing system to provide an visual indicator module 504 that is configured to perform the functions of the visual indicator systems, smart wear/wearable devices, and/or non-autonomous vehicles and personal transportation devices discussed below. In the specific example illustrated in FIG. 5, the visual indicator module 504 may generate visual indications to be provided on a visual indicator 512 based on environmental information and user information generated by a sensor system 510. The visual indicator module 504 may also be configured to process visual indications received from the autonomous vehicle 102a, the RSE unit 108 and/or other actors 106a and/or 106b in the physical environment 104.

The chassis 502 may further house a communication system 506 that is coupled to the visual indicator module 504 (e.g., via a coupling between the communication system 506 and the processing system). The communication system 506 may include software or instructions that are stored on a computer-readable medium and that allow the visual indicator system 500 to send and receive information through the communication networks discussed above. For example, the communication system 506 may include a first communication interface to provide for communications through the network 112 as detailed above (e.g., first (e.g., long-range) transceiver(s)). In an embodiment, the first communication interface may be a wireless antenna that is configured to provide communications with IEEE 802.11 protocols (Wi-Fi), cellular communications, satellite communications, other microwave radio communications and/or communications. The communication system 506 may also include a second communication interface that is configured to provide direct communication with the autonomous vehicle 102a, the RSE unit 108, a user device of the actor 106a, the visual indicator system 120b, and/or other devices within the physical environment 104 discussed above with respect to FIG. 1 (e.g., second (e.g., short-range) transceiver(s)). For example, the second communication interface may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 502 may also house a storage system 508 that is coupled to the visual indicator module 504 through the processing system. The storage system 508 may store sensor data, visual indicator profiles that include visual indications associated with instructions, conditions, and/or translations that would be apparent to one of skill in the art in possession of the present disclosure.

In various embodiments, the visual indicator system 500 may include a sensor system 510 that may be housed in the chassis 502 and/or provided on the chassis 502. The sensor system 510 may be coupled to the visual indicator module 504 via the processing system. The sensor system 510 may include one or more sensors that gather sensor data about the visual indicator system 500, a user of the visual indicator system 500, the physical environment 104 and/or a personal transportation device or non-autonomous vehicle that may be provided to the visual indicator module 504. The sensor data may be used by the visual indicator module 504 to generate visual indications via the visual indicator 512. In various embodiments, the sensor system 510 may include an accelerometer, a gyroscope, a positioning system (e.g., GPS), a heart rate monitor, other biometric sensors, an actuator, a pressure sensor, and/or any other sensor that would be apparent to one of skill in the art in possession of the present disclosure that may generate data that may provide insight into a direction, speed, position, and/or intent of the visual indicator system 500 and/or the user of the visual indicator system 500.

The chassis 502 may also house the visual indicator 512 or the visual indicator 512 may be partially provided on the chassis 502 to provide a direct line-of-sight with the physical environment 104. The visual indicator 512 may include one or more lights (e.g., Light-emitting diodes (LEDs), halogen bulbs, fluorescent bulbs, incandescent bulbs, lasers, and/or other light generating devices) that are configured to generate 100-1,000,000 lumens of light, such as the full spectrum of visible light, a partial spectrum of visible light, and/or are configured to provide adjustable illumination based on the amount of sunlight illuminating the physical environment 104 such that the light generated by the visual indicator 512 may be distinguishable from the illumination of the physical environment 104 by the sun (e.g., partial or full sun) and/or some artificial lighting in cases where the physical environment 104 is indoors. If the visual indicator 512 includes a plurality of lights, the lights may be provided in different arrangements (e.g., a circular arrangement, a linear arrangement, an oval arrangement, a quadrilateral arrangement, and/or any other shaped arrangement that would be apparent to one of skill in the art in possession of the present disclosure. The each of the plurality of lights may be configured to independently activate and/or deactivate such that various visual indications may be provided by the visual indicator 512 by activating and deactivating particular lights.

The chassis 502 may also house a user input/output (I/O) system 514. The user I/O system 514 may be coupled to the visual indicator module 504 via the processing system. The user I/O system 514 may provide one or more input devices such as, for example, keyboards, touchscreens, pointing devices such as mouses, trackballs, and trackpads, a voice control system, and/or a variety of other input devices for the actor 106a to provide inputs to the visual indicator system 500 that would be apparent to one of skill in the art in possession of the present disclosure. The user I/O system 514 may include one or more output devices such as a haptic feedback device that is configured to provide sounds, vibrations, visualizations, and/or other tactile and/or haptic feedback known in the art.

The chassis 502 may also house a power supply system 516 that may include and/or be configured to couple to a battery. For example, the power supply system 516 may include an integrated rechargeable battery that may be recharged in the chassis 502 using methods known in the art, and/or may include other power sources that would be apparent to one of skill in the art in possession of the present disclosure. In some embodiments, a user device may be configured to couple to the chassis 502 (e.g., via a port system that includes a power port) that may provide for the recharging of a rechargeable battery included in the power supply system 516. In various embodiments, port systems may include a data port configured to communicate data between the visual indicator module 504 and the user device (e.g., via a cable or other connector.) In other embodiments, the power supply system 516 may be configured to accept a replaceable, non-rechargeable battery while remaining within the scope of the present disclosure as well. While visual indicator system 500 has been illustrated and described, one of skill in the art in possession of the present disclosure will recognize that the teachings of the present disclosure will be beneficial for a variety of visual indicator systems that would be apparent to one of skill in the art in possession of the present disclosure and, as such, a wide variety of modifications to the number, types, and orientation of devices and modules in the visual indicator system 500 will fall within the scope of the present disclosure as well.

Figure 6:
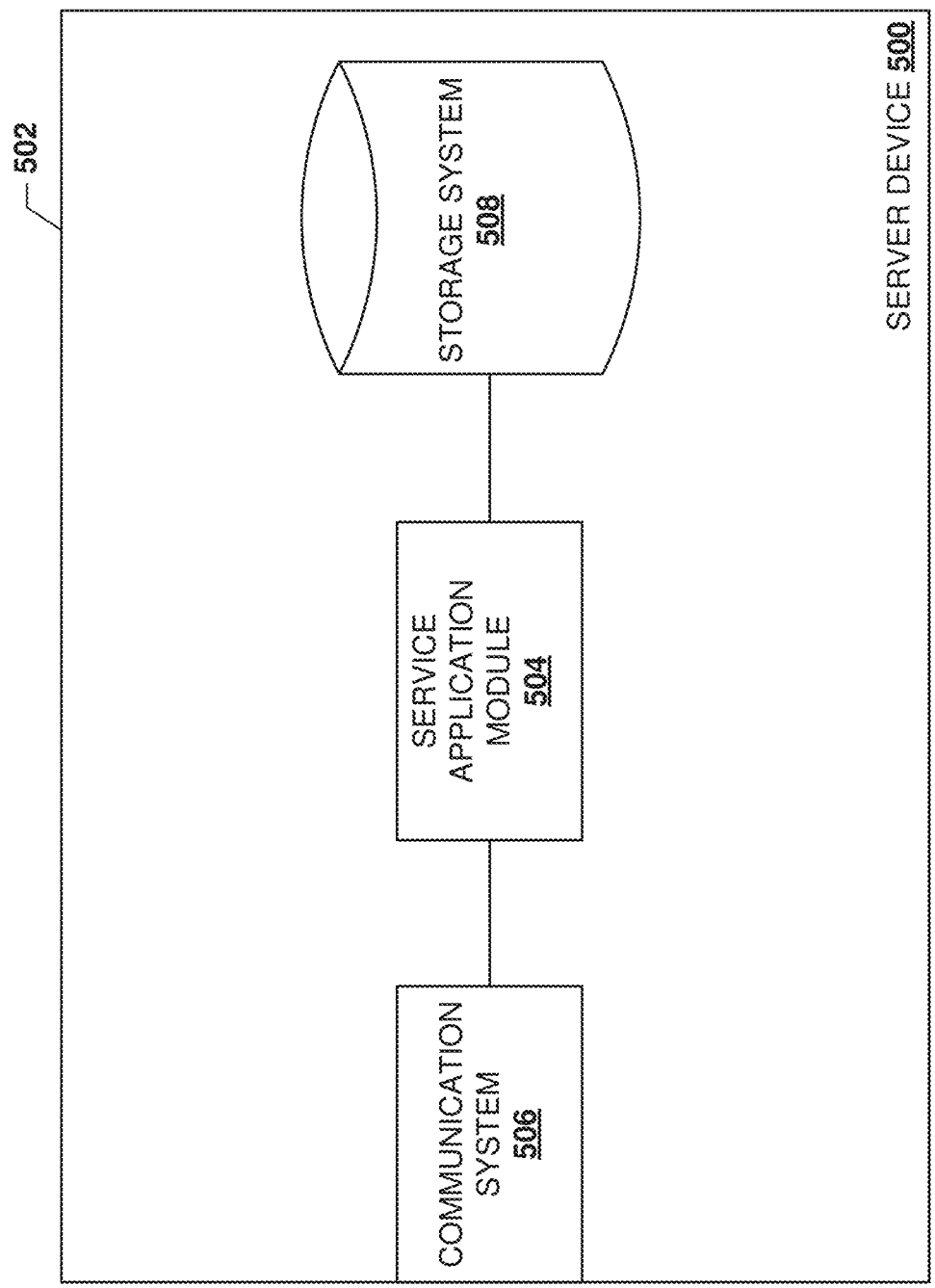
FIG. 6 is a schematic view illustrating an embodiment of a server device used in the autonomous vehicle signaling system of FIG. 1.

Referring now to FIG. 6, an embodiment of a server device 600 is illustrated that may be the server device 110 discussed above with reference to FIG. 1. In various embodiments, the server device 600 is a visual indicator server device that provides visual indicator profiles, however other server device that provide other services are contemplated as well. In the illustrated embodiment, the server device 600 includes a chassis 602 that houses the components of the server device 600, only some of which are illustrated in FIG. 6. For example, the chassis 602 may house a processing system (not illustrated) and a non-transitory memory system (not illustrated) that includes instructions that, when executed by the processing system, cause the processing system to provide a service application module 604 that is configured to perform the functions of the service application module and/or server devices discussed below. In the specific example illustrated in FIG. 6, the service application module 604 is configured as an visual indicator application to provide visual indicator profiles that include visual indications associated with instructions, translations, and/or conditions to the autonomous vehicle 102a, the RSE units 108, and/or the visual indicator systems 120a and/or 120b associated with the actors 106a and/or 106b when those visual indicator systems 120a and/or 120b are coupled to the network 112. However, one of skill in the art in possession of the present disclosure will recognize that the service application module 604 may provide any number of services from various service providers for autonomously navigating the autonomous vehicle 102a.

The chassis 602 may further house a communication system 606 that is coupled to the service application module 604 (e.g., via a coupling between the communication system 606 and the processing system) and that is configured to provide for communication through the network 112 as detailed below. The communication system 606 may allow the server device 600 to send and receive information over the network 112 of FIG. 1. The chassis 602 may also house a storage device (not illustrated) that provides a storage system 608 (e.g., the autonomous vehicle signaling database 118) that is coupled to the service application module 604 through the processing system. The storage system 608 may be configured to store authentication credentials, cryptographic keys and/or certificates used to authenticate communication within the autonomous vehicle signaling system 100 and/or visual indicator profiles. While a specific server device 600 has been illustrated and described, one of skill in the art in possession of the present disclosure will recognize that the teachings of the present disclosure will be beneficial for a variety of server devices that would be apparent to one of skill in the art in possession of the present disclosure and, as such, a wide variety of modifications to the number, types, and orientation of devices and modules in the server device 600 will fall within the scope of the present disclosure as well.

Figure 7:
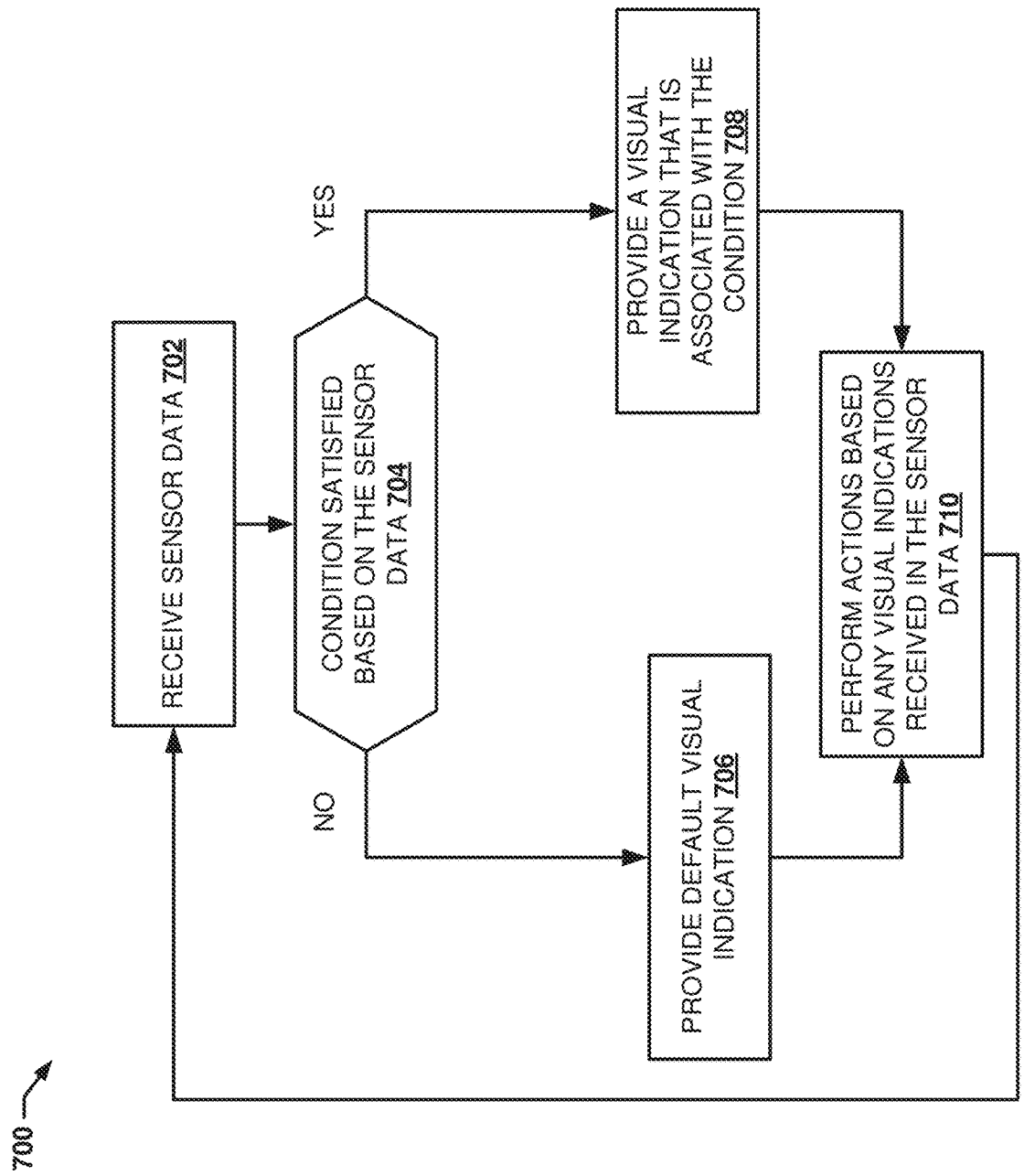
FIG. 7 is a flow chart illustrating an embodiment of a method of autonomous vehicle signaling.

Referring now to FIG. 7, an embodiment of a method 700 of autonomous vehicle signaling is illustrated. The method 700 will be discussed in reference to the Figs. above. The method 700 is described as being performed by the visual indicator system 120a of the autonomous vehicle 102a, the visual indicator system 120d of the RSE unit 108, and the visual indicator system 120a associated with the actor 106a and/or the visual indicator system 120b associated with the actor 106b. The method 700 begins at block 702 where first sensor data is received. In an embodiment of block 702 and from the perspective of the autonomous vehicle 102a, the first sensor data may be generated by the sensor system 236 of the autonomous vehicle 102a and provided to the autonomous vehicle controller 204. In various embodiments, the first sensor data may include autonomous vehicle data of the autonomous vehicle 200 and/or environmental data of the physical environment 104. The environment data of the physical environment 104 may include actor data of actors 102b, 106a, 106b, and/or 108. The actor data may further include visual indications provided by the visual indicator systems 120a, 120b, and/or 120d via the visual indicator 422 for the visual indicator system 120d and the visual indicator 512 for the visual indicator system 120a and/or 120b associated with actor 106a and 106b, respectively, and provided according to the method 700 described herein. The visual indications may be captured by the imagining sensor system 302 while other environment data and/or actor data may be captured by the radar system 306, the lidar system 308, and/or the motion detector 310.

In an embodiment of block 702 and from the perspective of the visual indicator system 120a associated with actor 106a and/or the visual indicator system 120b associated with actor 106b, the first sensor data may be generated by the sensor system 510 of the visual indicator system 500 and provided to the visual indicator module 504. In various embodiments, the first sensor data may include visual indicator system data of the visual indicator system 500. In other embodiments, the first sensor data may include environmental data of the physical environment 104. The environmental data of the physical environment 104 may include actor data of actors 102a, 102b, 108 and 106b when the visual indicator system 500 is the visual indicator system 120a. The actor data may further include visual indications provided by the visual indicator systems 120b, 120c, and/or 120d via the visual indicator 422 for the visual indicator system 120d, the visual indicator 512 for the visual indicator system 120b associated with actor 106b, or the visual indicator 240 of the autonomous vehicle 102a and provided according to the method 700 described herein. The visual indications and/or environmental data may be captured by an imaging sensor and/or light detector included in the sensor system 510.

In an embodiment of block 702 and from the perspective of the visual indicator system 120c of the RSE unit 108, the first sensor data may be generated by the sensor system 420 of the RSE unit 108 and provided to the visual indicator module 408. In various embodiments, the first sensor data may include RSE unit data of the RSE unit 400. In other embodiments, the first sensor data may include environmental data of the physical environment 104. The environmental data of the physical environment 104 may include actor data of actors 102a, 102b, 106a and/or 106b. The actor data may further include visual indications provided by the visual indicator systems 120a, 120b, and/or 120c via the visual indicator 512 for the visual indicator system 120a associated with actor 106a and/or the visual indicator system 120b associated with the actor 106b, or the visual indicator 240 of the autonomous vehicle 102a and provided according to the method 700 described herein. The visual indications and/or environmental data may be captured by an imaging sensor included in the sensor system 420.

The method 700 may then proceed to decision block 704 where it is determined whether a condition is satisfied based on the sensor data. In an embodiment of decision block 704 and from the perspective of the visual indicator system 120c associated with the autonomous vehicle 102a, the autonomous vehicle controller 204 may determine whether the sensor data satisfies a condition. In an embodiment, the condition may include one or more actions that need to be performed before the condition is satisfied. For example, the one or more action may include one or more actions of the autonomous vehicle 102a and/or one or more actions within the physical environment 104. In an embodiment, the condition may be one of a plurality of conditions that are stored in the autonomous vehicle storage system 214. Each of the plurality of conditions stored in the autonomous vehicle storage system 214 may be associated with a respective visual indication. For example, a first condition of the plurality of conditions may include a first action of the autonomous vehicle 102a of acceleration. If the first sensor data indicates that the autonomous vehicle 102a is accelerating, the first condition may be satisfied. In another example, a second condition of the plurality of conditions may include the first action of acceleration and a second action of a specific rate of acceleration of the autonomous vehicle 102. If both actions are indicated by the sensor data, then the second condition is satisfied. In other examples, the first action and/or second action may include an action associated with environmental data of the physical environment 104 such as detecting a visual indication within the physical environment. The autonomous vehicle controller 204 may detect a visual indication and computationally process the visual indication against a plurality of visual indications in the autonomous vehicle storage system 214 that are associated with the plurality of conditions to determine the condition that is associated with the detected visual indication. For example, the sensor system 236 may have detected a visual indication that is associated with a condition that includes an action of deceleration of the visual indicator system 120a, 120b, and/or 120d.

In an embodiment of decision block 704 and from the perspective of the visual indicator system 120a and/or 120b associated with the actors 106a and/or 106b, respectively, the visual indicator system 500 may determine whether the sensor data satisfies a condition. In an embodiment, the first condition may include one or more actions that need to be performed before the first condition is satisfied. For example, the one or more actions may include one or more actions of the visual indicator system 500 and/or one or more actions within the physical environment 104. In an embodiment, the condition may be one of a plurality of conditions that are stored in the storage system 508 and included in the visual indicator profiles. Each of the plurality of conditions stored in the storage system 508 may be associated with a respective visual indication. For example, a first condition of the plurality of conditions may include a first action of the visual indicator system 500 accelerating, which indicates that the actor 106a or 106b is accelerating. If the sensor data indicates that the visual indicator system 500 is accelerating, the first condition may be satisfied. In another example, a second condition of the plurality of conditions may include the first action of acceleration and a second action of a specific rate of acceleration of the visual indicator system 500. If both actions are indicated by the first sensor data, then the second condition is satisfied. In other examples, the first action and/or second action may include an action associated with environmental data of the physical environment 104 such as detecting a visual indication within the physical environment 104. The visual indicator module 504 may detect a visual indication and computationally process the visual indication against a plurality of visual indications in the storage system 508 that are associated with the plurality of conditions to determine the condition and the one of more actions of the condition that are associated with the detected visual indication. For example, the sensor system 236 may have detected a visual indication that is associated with a condition that includes an action of deceleration of the visual indicator system 120c associated with the autonomous vehicle 102a. Thus, the action associated with the environmental data of the physical environment 104 may include the action(s) of the condition that is associated with the detected visual indication. In various examples, the one or more actions of the visual indicator system 500 may be caused by the actions associated with the environment data of the physical environment 104 or vice versa as discussed in block 710 below.

In an embodiment of decision block 704 and from the perspective of the visual indicator system 120d associated with the RSE unit 108, the visual indicator module 408 may determine whether the sensor data satisfies a condition. In an embodiment, the condition may include one or more actions that need to be performed before the condition is satisfied. For example, the one or more actions may include one or more actions of the RSE unit 400 and/or one or more actions of actors within the physical environment 104. In an embodiment, the condition may be one of a plurality of conditions that are stored in the storage system 508 included in a visual indicator profile. Each of the plurality of conditions stored in the storage system 418 may be associated with a respective visual indication. For example, a first condition of the plurality of conditions may include a first action of a portion of the RSE unit 400 accelerating (e.g., a railroad gate closing). If the first sensor data indicates that the RSE unit 400 is accelerating, the first condition may be satisfied. In another example, a second condition of the plurality of conditions may include a first action (e.g., acceleration) and a second action (e.g., a specific rate of acceleration) of the RSE unit 400. If both actions are indicated by the first sensor data, then the first condition is satisfied. In other examples, the first action and/or second action may include an action associated with environmental data of the physical environment 104 such as detecting a visual indication within the physical environment 104. The visual indicator module 408 may detect, via the sensor system 420, a visual indication and computationally process the visual indication against a plurality of visual indications in the storage system 418 that are associated with the plurality of conditions to determine the condition and the one of more actions of the condition that are associated with the detected visual indication. For example, the sensor system 420 may have detected a visual indication that is associated with a condition of deceleration of the visual indicator system 120c associated with the autonomous vehicle 102a. Thus, the action associated with the environmental data of the physical environment may include the action(s) of the condition that is associated with the detected visual indication. In various examples, the one or more actions of the visual indicator module 408 may be caused by the actions associated with the environmental data of the physical environment 104 or vice versa.

If no condition is satisfied at decision block 704, then the method 700 may proceed to block 706 where a default visual indication is provided, via a visual indicator, that is associated with no condition being satisfied. In an embodiment of block 706 and from the perspective of the autonomous vehicle 102a, the autonomous vehicle controller 204 may determine that the sensor data indicates that no condition is satisfied. The visual indicator 240 may provide a default visual indication. For example, a visual indicator 240 that includes a headlight may provide a constant light intensity that the headlight would provide under normal operating conditions of the autonomous vehicle 102a at night. In other examples, the default visual indication provided by the visual indicator 240 may be the absence of light being provided by the visual indicator 240.

In an embodiment of block 706 and from the perspective of the visual indicator system 120a and/or 120b, the visual indicator module 504 of the visual indicator system 500 may determine that the sensor data indicates that no condition is satisfied. The visual indicator 512 may provide a default visual indication. For example, visual indicator 512 may provide a constant light intensity that the visual indicator 512 would provide under normal operating conditions of the visual indicator 512. In other examples, the default visual indication provided by the visual indicator 512 may be the absence of light being provided by the visual indicator 512.

In an embodiment of block 706 and from the perspective of the visual indicator system 120d, the visual indicator module 408 of the RSE unit 400 may determine that the first sensor data indicates that no condition is satisfied. The visual indicator 422 may provide a default visual indication. For example, visual indicator 422 may provide a constant light intensity that the visual indicator 422 would provide under normal operating conditions of the RSE unit 400. In other examples, the default visual indication provided by the visual indicator 422 may be the absence of light being provided by the visual indicator 422. After block 706, the method 700 may proceed to block 710, discussed below.

If the condition is satisfied at decision block 704, then the method 700 proceeds to block 708 where a visual indication that is associated with the condition is provided via the visual indicator to the physical environment. In an embodiment of block 708 and from the perspective of the visual indicator system 120c of the autonomous vehicle 102a, the autonomous vehicle controller 204 may provide, via the visual indicator 240, a visual indication that is associated with the condition. The autonomous vehicle controller 204 may retrieve the instructions associated with the condition of the visual indicator profile stored in the autonomous vehicle storage system 214. The instructions may include instructions to provide a visual indication via the visual indicator 240. The autonomous vehicle controller 204 may execute the instructions that cause the visual indicator 240 to generate and provide the visual indication. For example, if the condition that includes the actions of an autonomous vehicle 102a accelerating is satisfied, then a visual indicator 240 that includes a circular arrangement of lights may activate the lights of the visual indicator 240 to provide a clockwise "spinning" effect according to instructions provided by the autonomous vehicle controller 204. In other examples, if the condition that includes the actions of the autonomous vehicle 102a decelerating but not braking, then the visual indicator 240 that includes the circular arrangement of lights may activate the lights of the visual indicator 240 to provide a counterclockwise "spinning" effect according to instructions provided by the autonomous vehicle controller 204. The rate of the "spinning" may commensurate with the rate of acceleration or deceleration. In another example, if the autonomous vehicle 102a is actively braking while decelerating, at least a subset of the lights of the visual indicator 240 may display red while the counterclockwise "spinning effect" is being provided according to instructions provided by the autonomous vehicle controller 204.

In other embodiments, the condition may be associated with an intent of the autonomous vehicle. For example, the autonomous vehicle 102a may recognize that the actor 106a at an intersection has the right-of-way and the autonomous vehicle controller 204 may provide a visual indication associated with the condition of recognizing a right-of-way of the actor 106a such that the actor 106a understands that the autonomous vehicle 102a is going to remain stopped until the actor 106a crosses or until the actor 106a is given a predetermined amount of time to cross the intersection. For example, the visual indicator 240 that includes a passenger side headlight that is closest to the actor 106a may display a subset of green lights that may indicate to the actor 106a that the autonomous vehicle 102a is giving the actor 106a the right-of-way to cross the intersection. If the actor 106a does not proceed, a countdown may begin which can be indicated via visual indications provided by the headlight such that the green lights begin to disappear, which indicates that the autonomous vehicle is going to proceed if the actor 106a does not cross the intersection.

In an embodiment of block 708 and from the perspective of the visual indicator system 120a and/or 120b, the visual indicator module 504 may provide, via the visual indicator 512, a visual indication that is associated with the condition. The visual indicator module 504 may retrieve the instructions associated with the condition of the visual indicator profile stored in the storage system 508. The instructions may include instructions to provide a visual indication via the visual indicator 512. The visual indicator module 504 may execute the instructions that cause the visual indicator 512 to provide the visual indication. For example, the condition that includes the actions of the actor 106a associated with the visual indicator system 500 accelerating, then a visual indicator 512 that includes a circular arrangement of lights may activate the lights of the visual indicator 512 to provide a clockwise "spinning" effect visual indication according to instructions provided by the visual indicator module 504. In other examples, if the condition that includes the actions of the actor 106a associated with the visual indicator system 500 decelerating, then the visual indicator 240 that includes a circular arrangement of lights may activate the lights of the visual indicator 240 to provide a counterclockwise "spinning" effect visual indication according to instructions provided by the visual indicator module 504. The rate of the "spinning" may commensurate with the rate of acceleration or deceleration. In another example, if the actor 106a is an actor without agency such as a small child or a pet, then a second visual indication may be provided in addition to the visual indication associated with the first condition according to instructions provided by the visual indicator module 504.

In other embodiments, the condition may be associated with an intent of the actor 106a. For example, the actor 106a may see that the autonomous vehicle 102a has stopped at the intersection to wait for the actor 106a to cross. However, the actor 106a may need to tie her shoe and provide an input (e.g., an activation of a button, a voice command, etc.) to the user I/O system 514 to provide a visual indication that gives up the right-of-way provided to the actor 106a to the autonomous vehicle 102a.

In an embodiment of block 708 and from the perspective of the visual indicator system 120d, the visual indicator module 408 of the RSE unit 108 may provide, via the visual indicator 422, a visual indication that is associated with the condition. The visual indicator module 408 may retrieve the instructions associated with the condition of a visual indicator profile stored in the storage system 418. The instructions may include instructions to provide a visual indication via the visual indicator 422. The visual indicator module 408 may execute the instructions that cause the visual indicator 422 to provide the visual indication. For example, if the condition that includes the first actions of the RSE unit 108 is detected, then a visual indicator 422 may provide a first visual indication via the visual indicator 422 (e.g., a railway gate closing may cause a first visual indication) according to instructions provided by the visual indicator module 408. If the condition that includes second actions of the RSE unit 108 is detected, then the visual indicator module 408 may provide second visual indication via the visual indicator 422 (e.g., a railway gate opening may cause a second visual indication).

The method 700 may then proceed to block 710 where an action is performed based on visual indications in the sensor data. In an embodiment of block 710 and from the perspective of the visual indicator system 120c of the autonomous vehicle 102a the autonomous vehicle controller 204 may process any light indications received in the sensor data to determine whether the light indication corresponds with an action. Thus, block 710 may be performed any time after block 702. For example, a light indication received by the sensor system 236 from the visual indication system 120b associated with the actor 106b may indicate an acceleration of the actor 106b. The autonomous vehicle controller 204 may use the visual indication in addition to other sensor data to determine an action for the autonomous vehicle 102a other than providing a visual indication. For example, the acceleration of the actor 106b indicated by the visual indication, the distance between the autonomous vehicle 102a and the actor 106b, and the current speed of the autonomous vehicle 102 may cause the autonomous vehicle controller 204 to determine that the braking system 232 needs to engage brakes to slow the autonomous vehicle 102a to avoid colliding with the actor 106b and performs this action. As discussed above, the braking of the autonomous vehicle 102a (e.g., deceleration) may correspond with a visual indication that autonomous vehicle 102a provides via the visual indicator 240 as well. As such, the autonomous vehicle 102a may communicate via the visual indicator system 242 in lieu of or in addition to formal vehicle-to-vehicle communication networks.

In an embodiment of block 710 and from the perspective of the visual indicator system 120a and/or 120b, the visual indicator system 500 may process any visual indications received in the sensor data to determine whether the visual indication corresponds with an action. The visual indicator module 504 may use the visual indication in addition to other sensor data provided by the sensor system 510 to determine an action for the visual indication system 120a and/or 120b. For example, a visual indication received by the sensor system 510 of the visual indication system 120b associated with actor 106b from the visual indication system 120c associated with the autonomous vehicle 102a may indicate an acceleration of the autonomous vehicle 102a. The actor 106b may also be accelerating toward the street and thus the sensor system 510 may detect the acceleration of the actor 106b, the acceleration of the autonomous vehicle via the visual indication received, and/or other sensor data. Based on the visual indication provided by the autonomous vehicle, the visual indicator module 504 may determine to provide a warning to the actor 106b to stop via the user I/O system 514. For example, an audio warning to stop may be provided by the user I/O system 514 and/or a haptic feedback may be provided by the user I/O system 514 to alert the actor 106b when the visual indication system 120b is incorporated into a wearable device. For example, a jacket may have a haptic feedback device incorporated into the chest area of the jacket that applies pressure to the chest of an actor 106a indicating to the actor 106b to stop.

In an embodiment of block 710 and from the perspective of the visual indicator system 120d, the visual indicator module 408 of the RSE unit 400 may process any visual indications received in the sensor data to determine whether the visual indication corresponds with an action and perform that action. The visual indicator module 408 may use the visual indication in addition to other sensor data provided by the sensor system 420 to determine an action for the RSE unit 108. For example, a visual indication received by the sensor system 420 of the visual indication system 120d associated with RSE unit 108 from the visual indication system 120c associated with the autonomous vehicle 102a may indicate an acceleration of the autonomous vehicle 102a and that the autonomous vehicle 102a is an emergency vehicle. The RSE unit 108 may include a gate that is down. The visual indication received from the autonomous vehicle 102a along with any other sensor data may cause the RSE application module 406 to lift the gate so that the autonomous vehicle 102a can proceed along its route. As discussed above, the lifting of gate may correspond with a visual indication that RSE unit 108 provides via the visual indicator 422 as well. After block 710, the method 700 may then loop back to block 702 to receive additional sensor data.

Thus, systems and methods of the present disclosure provide for autonomous vehicle signaling. By providing visual indications such as light signals, autonomous vehicles, roadside equipment, and/or actors within a physical environment may communicate their actions to each other. This allows machine-to-human communication such that human actors within the environment can understand what an autonomous vehicle is doing or what the autonomous vehicle is about to do. The human actor may also provide visual indications to the autonomous vehicle so that the autonomous vehicle knows what actions the actor is performing or about to perform. The systems and methods of the present disclosure improve autonomous vehicle safety and efficiency by providing a mechanism for communication between autonomous vehicles and other actors within the environment that cannot communicate via conventional vehicle-to-vehicle communication networks.

Figure 8:
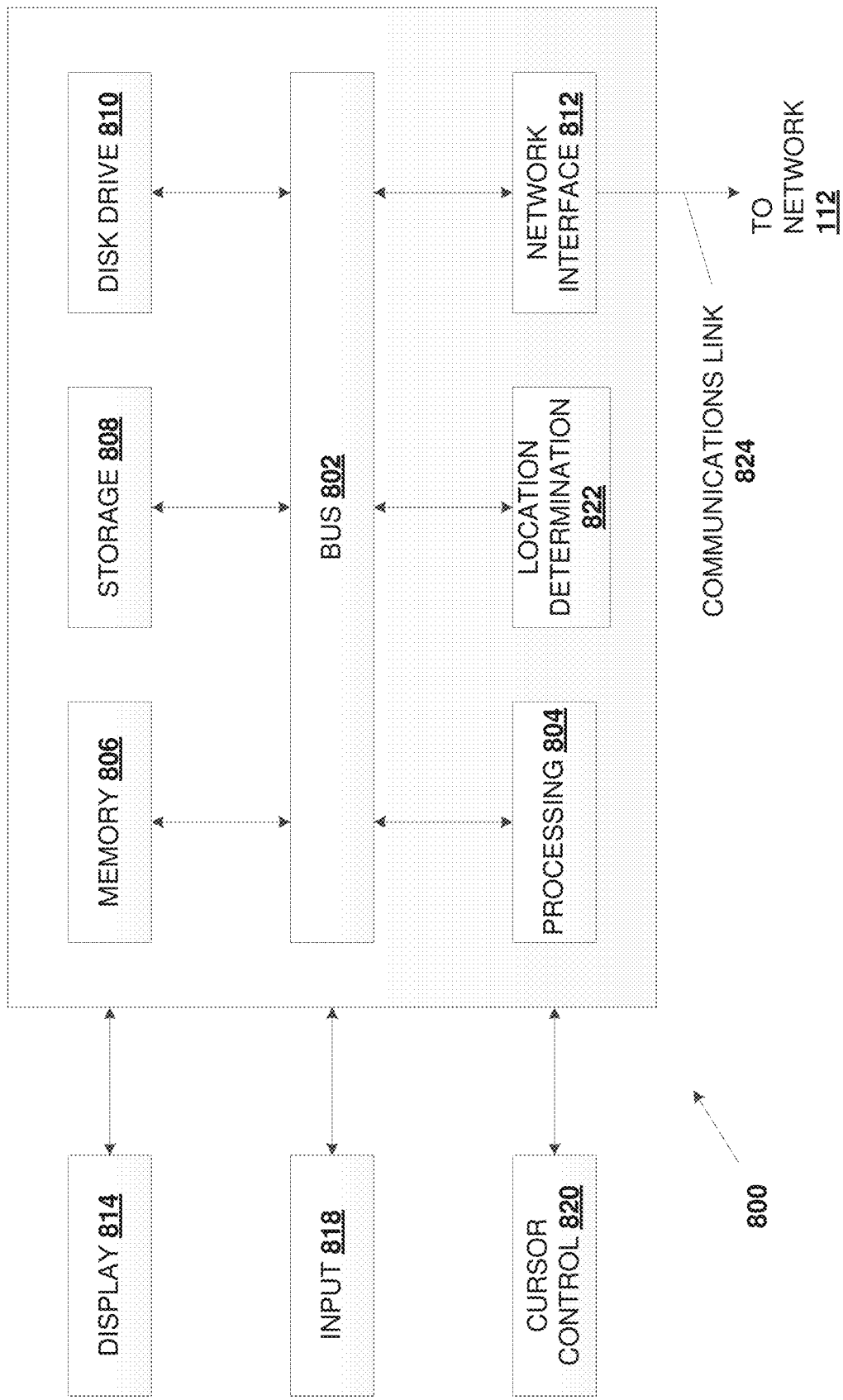
FIG. 8 is a schematic view illustrating an embodiment of a computer system.

Referring now to FIG. 8, an embodiment of a computer system 800 suitable for implementing, for example, visual indicator systems 120a-120d and 500, the RSE unit 108 and 400 and the server devices 110 and 600 and implementing in the autonomous vehicle 102a and 200 is illustrated. It should be appreciated that other devices utilized in the autonomous vehicle signaling system 100 discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), and/or a location determination component 822 (e.g., a Global Positioning System (GPS) device as illustrated, a cell tower triangulation device, and/or a variety of other location determination devices.) In one implementation, the disk drive component 810 may comprise a database having one or more disk drive components.

In accordance with embodiments of the present disclosure, the computer system 800 performs specific operations by the processing component 804 executing one or more sequences of instructions contained in the system memory component 806, such as described herein with respect to the drone(s), the drone docking station(s), the service platform, and/or the remote monitor(s). Such instructions may be read into the system memory component 806 from another computer-readable medium, such as the static storage component 808 or the disk drive component 810. In other embodiments, hardwired circuitry may be used in place of or in combination with software instructions to implement the present disclosure.

Logic may be encoded in a computer-readable medium, which may refer to any medium that participates in providing instructions to the processing component 804 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 810, volatile media includes dynamic memory, such as the system memory component 806, and tangible media employed incident to a transmission includes coaxial cables, copper wire, and fiber optics, including wires that comprise the bus 802 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 112 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (e.g., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A method, comprising:
receiving, by an autonomous vehicle comprising a processor, first sensor data;
determining, by the autonomous vehicle, based on the first sensor data that a first condition is satisfied; and
presenting, by the autonomous vehicle in response to the first condition being satisfied, via a first visual indicator, a first visual indication that is associated with the first condition to a physical environment external to the autonomous vehicle, wherein the first condition comprises a first rate of motion of the autonomous vehicle, wherein the first visual indication comprises a display pattern in motion that comprises a spinning visual indication, wherein a second rate of spinning of the spinning visual indication provides an indication of the first rate of motion of the autonomous vehicle, wherein a first direction of spinning of the spinning visual indication indicates acceleration of the autonomous vehicle, wherein a second direction of the spinning indicates deceleration of the autonomous vehicle, and wherein the first direction is different from the second direction.

2. The method of claim 1, wherein the first sensor data comprises first actor data of a first actor that is associated with the first visual indicator and the first actor data indicates that the first actor is performing a first action, and wherein the first condition further comprises the first actor performing the first action.

3. The method of claim 2, wherein the first sensor data comprises second actor data of a second actor that is in the physical environment and the second actor data indicates that the second actor is performing a second action.

4. The method of claim 3, wherein the first condition further comprises the second actor performing the second action.

5. The method of claim 3, wherein the second action causes the first action.

6. The method of claim 3, wherein the second actor data comprises a second visual indication provided by a second visual indicator associated with the second actor, and wherein the second visual indication is associated with the second action.

7. The method of claim 1, further comprising:
receiving, by the autonomous vehicle, second sensor data subsequent to the first sensor data;
determining, by the autonomous vehicle based on the second sensor data, that a second condition is satisfied; and
presenting, by the autonomous vehicle in response to the second condition being satisfied and via the first visual indicator, a second visual indication to the physical environment that is different than the first visual indication.

8. The method of claim 1, further comprising:
receiving, by the autonomous vehicle, second sensor data subsequent to the first sensor data;
determining, by the autonomous vehicle based on the second sensor data, that no condition is satisfied; and
presenting, by the autonomous vehicle in response to no condition being satisfied and via the first visual indicator, a second visual indication to the physical environment that is different than the first visual indication and the second visual indication.

9. The method of claim 1, further comprising:
receiving, by the autonomous vehicle, second sensor data subsequent to the first sensor data;
determining, by the autonomous vehicle based on the second sensor data, that a second condition is satisfied; and
presenting, by the autonomous vehicle in response to the second condition being satisfied and via a second visual indicator, a second visual indication to the physical environment that is different than the first visual indication provided by the first visual indicator.

10. The method of claim 1, further comprising:
performing, by the autonomous vehicle, an action based on a second visual indication that is included in the first sensor data.

11. The method of claim 10, wherein the action comprises facilitating an output from a user output device included in a user input/output system.

12. A visual indicator system, comprising:
a processor; and
a memory that stores executable instructions that, when executed by the processor facilitate performance of operations, comprising:
receiving sensor data via a sensor system that comprises a light detector that distinguishes light of visual indicators from other light sources;
determining, based on at least the sensor data, that a condition is satisfied; and
generating, in response to the condition being satisfied and for display via a visual indicator, a first visual indication that is associated with the condition and is presented to a physical environment external to a vehicle, wherein the condition comprises a first rate of motion of the vehicle, wherein the first visual indication comprises a display pattern in motion that comprises a spinning visual effect, wherein a second rate of spinning of the spinning visual effect provides an indication of the first rate of motion of the vehicle, wherein a first direction of spinning of the spinning visual effect indicates an acceleration of the vehicle, wherein a second direction of the spinning indicates a deceleration of the vehicle, and wherein the first direction is different from the second direction.

13. The visual indicator system of claim 12, wherein the operations further comprise:
performing an action based on a second visual indication that is included in the sensor data.

14. The visual indicator system of claim 12, wherein the visual indicator system is housed in a portable device.

15. A non-transitory machine-readable medium, comprising executable instructions that, when executed by a processor of a device, facilitate performance of operations comprising:
receiving first sensor data associated with a vehicle in which the device is located;
determining, based on the first sensor data, that a first condition is satisfied; and
providing, in response to the first condition being satisfied and via a first visual indicator, a first visual indication that is associated with the first condition to physical environment external to the vehicle, wherein the first condition comprises a first rate of motion of the vehicle, wherein the first visual indication comprises a display pattern in motion that comprises a spinning visual effect, wherein a second rate of spinning of the spinning visual effect provides an indication of the first rate of motion of the vehicle, wherein a first direction of spinning of the spinning visual effect indicates acceleration of the vehicle, wherein a second direction of the spinning indicates deceleration of the vehicle, and wherein the first direction is different from the second direction.

16. The non-transitory machine-readable medium of claim 15, wherein the operations further comprise:
performing an action based on another visual indication that is included in the sensor data.

17. The non-transitory machine-readable medium of claim 15, wherein the operations further comprise:
receiving second sensor data subsequent to the first sensor data;
determining, based on the second sensor data, that a second condition is satisfied; and
providing, in response to the second condition being satisfied and via a second visual indicator, a second visual indication to the physical environment that is different than the first visual indication.

18. The non-transitory machine-readable medium of claim 15, wherein the first condition further comprises the deceleration of the vehicle without brakes of the vehicle being applied, and wherein the first visual indication further provides an additional indication that the brakes of the vehicle are not being applied during the deceleration of the vehicle.

19. The method of claim 1, wherein the first condition further comprises the deceleration of the autonomous vehicle without brakes of the autonomous vehicle being applied, and wherein the first visual indication further provides an additional indication that the brakes of the autonomous vehicle are not being applied during the deceleration of the vehicle.

20. The visual indicator system of claim 12, wherein the condition further comprises the deceleration of the vehicle without brakes of the vehicle being applied, and wherein the first visual indication further provides an additional indication that the brakes of the vehicle are not being applied during the deceleration of the vehicle.

* * * * *